(12) United States Patent
Yasutomi et al.

(10) Patent No.: US 8,412,011 B2
(45) Date of Patent: Apr. 2, 2013

(54) OPTICAL FIBER CABLE

(75) Inventors: Tetsuya Yasutomi, Tokyo (JP);
Masayoshi Tsukamoto, Tokyo (JP);
Mitsuru Iwano, Tokyo (JP); Yoshihisa Rintsu, Tokyo (JP); Masanobu Aragaki, Tokyo (JP); Masaki Nishiguchi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 176 days.

(21) Appl. No.: 12/851,989

(22) Filed: Aug. 6, 2010

(65) Prior Publication Data
US 2010/0322573 A1  Dec. 23, 2010

Related U.S. Application Data

(60) Division of application No. 12/248,231, filed on Oct. 9, 2008, now Pat. No. 7,813,606, which is a continuation-in-part of application No. PCT/JP2008/050797, filed on Jan. 22, 2008.

(30) Foreign Application Priority Data

| Jan. 24, 2007 | (JP) | 2007-013202 |
| Jan. 24, 2007 | (JP) | 2007-013222 |
| Jan. 24, 2007 | (JP) | 2007-014146 |
| Jan. 24, 2007 | (JP) | 2007-014154 |

(51) Int. Cl.
*G02B 6/44* (2006.01)

(52) U.S. Cl. ......... 385/100; 385/102; 385/107

(58) Field of Classification Search ........... 385/100–107
See application file for complete search history.

(56) References Cited

U.S. PATENT DOCUMENTS

| 6,694,078 B2 | 2/2004 | Yasutomi et al. |
| 6,785,452 B2 | 8/2004 | Yasutomi |

(Continued)

FOREIGN PATENT DOCUMENTS

| CN | 1214386 A | 4/1999 |
| CN | 1444633 A | 9/2003 |

(Continued)

OTHER PUBLICATIONS

Masao Iwano et al., "Polyamide 12 and Applications—Protection for Optical Fibers—," "Plastic" Extra No., Plastics in Electronics Field, pp. 56-58 (Apr. 21, 1999).

(Continued)

*Primary Examiner* — Ellen Kim
(74) *Attorney, Agent, or Firm* — Oblon, Spivak, McClelland, Maier & Neustadt, L.L.P.

(57) ABSTRACT

It is an object of the present invention to provide an optical fiber cable which can reliably prevent increased transmission loss due to damage of the optical fiber as a result of the egg-laying behavior of cicadas. The cable includes at least an optical fiber 1, tension members 6 and a sheath 3. The sheath 3 has a shore D hardness of 55 or more and a minimum distance L from a surface of the optical fiber 1 to an outer surface of the sheath 3 of greater than 0.3 mm. Further, in the cable, the surface of sheath 3 has a coefficient of friction of 0.45 or less and the sheath 3 has a shore D hardness of 57 or more. In addition, the cable is made by using a specific flame retardant composition (P) as the sheath material.

5 Claims, 8 Drawing Sheets

U.S. PATENT DOCUMENTS

| | | | |
|---|---|---|---|
| 6,829,420 B2 * | 12/2004 | Matsuyama et al. | 385/109 |
| 7,053,145 B1 | 5/2006 | Tasaka et al. | |
| 2003/0118298 A1 * | 6/2003 | Matsuyama et al. | 385/110 |
| 2003/0161596 A1 * | 8/2003 | Register et al. | 385/106 |
| 2003/0180017 A1 | 9/2003 | Hayano et al. | |
| 2004/0001682 A1 | 1/2004 | Beuth et al. | |
| 2005/0031277 A1 * | 2/2005 | Japon | 385/109 |
| 2005/0238300 A1 * | 10/2005 | Jamet et al. | 385/100 |
| 2006/0014903 A1 * | 1/2006 | Vromman | 525/192 |
| 2006/0045451 A1 * | 3/2006 | Wu et al. | 385/127 |
| 2008/0248278 A1 | 10/2008 | Fisher et al. | |
| 2008/0292244 A1 * | 11/2008 | Kato et al. | 385/50 |
| 2009/0048382 A1 | 2/2009 | Lee et al. | |
| 2010/0254668 A1 * | 10/2010 | Consonni et al. | 385/102 |
| 2011/0085772 A1 * | 4/2011 | Benjamin et al. | 385/128 |
| 2011/0150402 A1 | 6/2011 | Hoshino et al. | |

FOREIGN PATENT DOCUMENTS

| | | |
|---|---|---|
| JP | 6-306121 | 11/1994 |
| JP | 7-500622 | 1/1995 |
| JP | 2001-166188 | 6/2001 |
| JP | 2001-208942 | 8/2001 |
| JP | 2001-337255 | 12/2001 |
| JP | 2006-65215 | 3/2006 |
| JP | 2006-65288 | 3/2006 |
| JP | 2006-313314 | 11/2006 |
| WO | WO 93/08221 | 4/1993 |
| WO | WO 2006/068309 A1 | 6/2006 |

OTHER PUBLICATIONS

U.S. Appl. No. 13/142,163, filed Jun. 24, 2011, Tsukamoto, et al.

Chinese Office Action issued May 22, 2012, in China Patent Application No. 201010586490.X (with English Translation).

Office Action issued in Counterpart Chinese Application No. 201010586490.X on Jan. 14, 2013 (w/ English translation).

* cited by examiner

# OPTICAL FIBER CABLE

CROSS-REFERENCES TO RELATED APPLICATIONS

This application is a divisional application of U.S. application Ser. No. 12/248,231 filed Oct. 9, 2008, which is a continuation-in-part application of PCT/JP2008/050797, international application filed Jan. 22, 2008 designating the United States of America, and claims the benefit of PCT/JP2008/050797. The entire contents of both applications are incorporated herein by reference.

This application also claims the benefit of priority from Japanese Patent Applications No. 2007-013222 filed Jan. 24, 2007, No. 2007-013202 filed Jan. 24, 2007, No. 2007-014146 filed Jan. 24, 2007 and No. 2007-014154 filed Jan. 24, 2007, the entire contents of each of which are incorporated herein by reference.

TECHNICAL FIELD

The present invention relates to an optical fiber cable having an optical fiber and tension members inside a sheath.

BACKGROUND ART

Conventionally, various optical fiber cables have been produced and used. Such optical fiber cables are produced by, for example, preparing a so-called optical fiber, which has a coating composed of a UV-curable resin or a thermosetting resin around the periphery of a glass optical fiber, and forming a sheath by providing a collective coating over this optical fiber, a pair of tension members and a support wire while positioning these members at specific locations. Examples of such an optical fiber cord or cable include those illustrated in FIG. 8, and are often referred to as "drop cables".

A drop optical fiber cable 41 is formed by collectively coating an optical fiber 42, which is one or a plurality of single optical fibers, optical fiber ribbons and the like, tension members 43, 43' made of steel wire, aramid resin and the like and a support wire 44 with a sheath 46 having a neck portion 45. To facilitate extraction of the internal optical fiber 42 etc. by breaking the sheath 46, in some cases a notch 47 is provided on the sheath 46. Further, for conventional optical fiber cables, to maintain flame retardance, it is common to use for the sheath material a flame retardant polyolefin having as a main component one or more resins selected from an ethylene-(meth)acrylic copolymer, an ethylene-alkyl(meth)acrylate copolymer and an ethylene-vinylacetate copolymer (e.g. Patent Documents 1 to 3).

However, when such optical fiber cables were laid overhead, over time their properties deteriorated for reasons which were unknown. Recently, it has finally been learned that the cause for this has been the egg-laying behavior of cicadas, which emerge during the summer season.

Specifically, the cause is the behavior of cicadas, which mistake the optical fiber cables laid overhead for the trunk or branches of a tree, cutting through the sheath with their ovipositor and laying eggs inside. If the ovipositor is inserted into the sheath in this manner, the optical fiber cable is damaged by the ovipositor, or moisture such as rain water tends to infiltrate into the cable interior from the opened holes. If moisture infiltrates into the cable in this manner, the risk of increased transmission loss due to this moisture dramatically increases.

Accordingly, as described in Patent Document 4, an optical fiber cable has been proposed in which a protective tape is arranged inside or on the outer surface of the sheath so as to at least partially surround the optical fiber which is coated by the sheath. If such an optical fiber cable is used, even should a cicada cut through the sheath with its ovipositor, the tip of the ovipositor is blocked by the protective tape and thus does not reach as far as the internal optical fiber. As a result, the above-described risks, specifically, the risks of optical fiber cable damage and increased transmission loss due to infiltrated moisture can be reduced.

Patent Document 1: Japanese Patent Application Laid-Open No. 2001-337255
Patent Document 2: Japanese Patent Application Laid-Open No. 2001-166188
Patent Document 3: Japanese Patent Application Laid-Open No. 2001-208942
Patent Document 4: Japanese Patent Application Laid-Open No. 2006-313314

DISCLOSURE OF THE INVENTION

However, even in this kind of optical fiber cable, the ovipositor may avoid the protective tape and cut through at an angle, thereby causing damage to the optical fiber. As a result, there is the risk of incurring increased transmission loss of the optical fiber.

In view of the above-described problems, it is an object of the present invention to provide an optical fiber cable which can reliably prevent increased transmission loss due to damage of the optical fiber as a result of the egg-laying behavior of cicadas.

An optical fiber cable according to the present invention for achieving the above-described object comprises at least an optical fiber, a tension member and a sheath which is collectively coated over the optical fiber and the tension member, characterized in that a shore D hardness of the sheath is 55 or more and a minimum distance L from the optical fiber to an outer surface of the sheath is greater than 0.3 mm.

Further, an optical fiber cable according to the present invention comprises at least an optical fiber, a tension member and a sheath which is collectively coated over the optical fiber and the tension member, characterized in that a shore D hardness of the sheath is 57 or more and a minimum distance L from a surface of the optical fiber to an outer surface of the sheath is greater than 0.2 mm.

An optical fiber cable according to the present invention for achieving the above-described object comprises at least an optical fiber, a tension member and a sheath which is collectively coated over the optical fiber and the tension member, characterized in that a coefficient of friction of the sheath surface is 0.45 or less and the sheath has a shore D hardness of 57 or more.

Further, an optical fiber cable according to the present invention comprises at least an optical fiber, a tension member and a sheath which is collectively coated over the optical fiber and the tension member, characterized in that a coefficient of friction of the sheath surface is 0.47 or less and a shore D hardness of the sheath is 62 or more.

An optical fiber cable according to the present invention for achieving the above-described object has a sheath of a flame retardant composition at the outer side of an optical fiber, the flame retardant composition (P) comprising a thermoplastic resin (A), a metal hydrate (B) of 60 to 150 parts by mass based on 100 parts by mass of the thermoplastic resin (A), and a red phosphorus (C) of 10 parts by mass or less based on 100 parts by mass of the thermoplastic resin (A), the thermoplastic resin (A) being composed of an ethylene/.alpha.-olefin copolymer (a) of 90 to 50 mass %, a polypropylene resin (b)

of 5 to 40 mass %, a polyolefin modified by an unsaturated carboxylic acid or its derivative (c-1) and/or ethylene-(meth) acrylic acid copolymer (c-2) of 0 to 20 mass % of, a styrene elastomer (d) 0 to 30 mass %, and an ethylene vinyl acetate copolymer (e-1) and/or ethylene-(meth)acrylate copolymer (e-2) of 0 to 40 mass %. Further, this optical fiber cord or cable is characterized in that the red phosphorus has an average particle size of 3 to 9 µm. Still further, the flame retardant composition (P) comprising a carbon (f) of 10 parts by mass or less based on 100 parts by mass of thermoplastic resin (A).

An optical fiber cable according to the present invention for achieving the above-described object has a sheath of a flame retardant composition at the outer side of the optical fiber, the flame retardant composition (P) comprising a thermoplastic resin (A), a metal hydrate (B) of 60 to 150 parts by mass based on 100 parts by mass of the thermoplastic resin (A), and a red phosphorus (C) of 10 parts by mass based on 100 parts by mass of the thermoplastic resin (A), the thermoplastic resin being composed of a polyethylene resin (a) of 90 to 50 mass %, a polyolefin modified by an unsaturated carboxylic acid or its derivative (b-1) and/or ethylene-(meth)acrylic acid copolymer (b-2) of 5 to 30 mass %, a polypropylene resin (c) of 0 to 40 mass %, a styrene elastomer (d) of 0 to 30 mass %, and an ethylene vinyl acetate copolymer (e-1) and/or ethylene-(meth)acrylate copolymer (e-2) 0 to 40 mass %. Further, this optical fiber cord or cable is characterized in that the red phosphorus has an average particle size of 3 to 9 µm. Still further, the flame retardant composition (P) comprising a carbon (f) of 10 parts by mass or less based on 100 parts by mass of thermoplastic resin (A).

According to the above-constituted present invention, an optical fiber cable can be provided which can reliably prevent increased transmission loss due to damage of the optical fiber as a result of the egg-laying behavior of cicadas over the entire length of the cable in the longitudinal direction.

DESCRIPTION OF SYMBOLS

Figure 1:
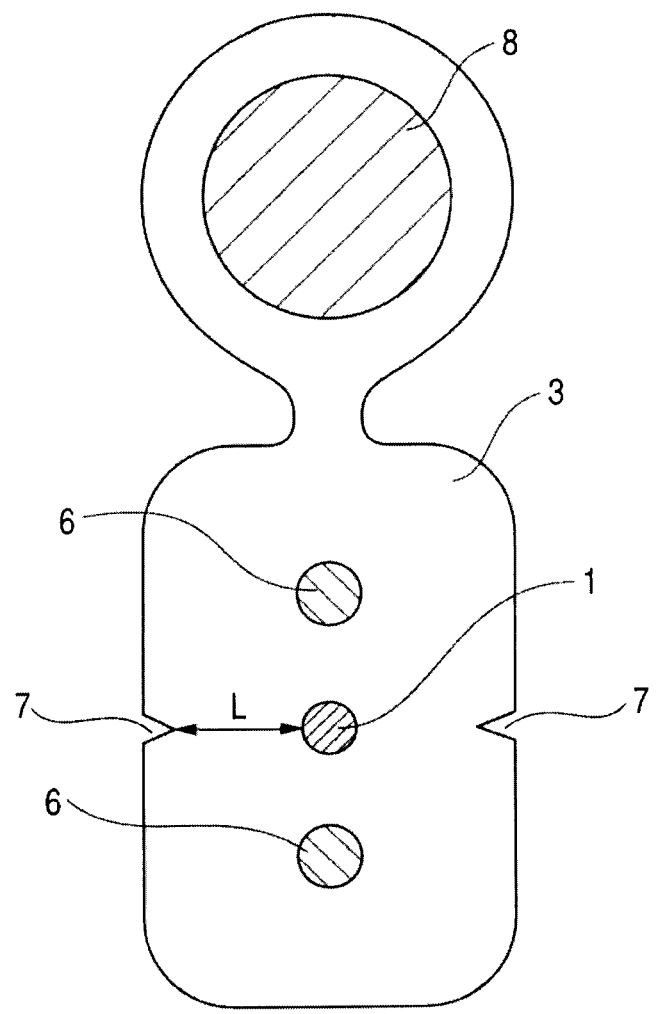
FIG. 1 is a cross-sectional view illustrating an embodiment of the optical fiber cable according to the present invention.

1 Optical fiber
2 Optical fiber ribbon
3 Sheath
6 Tension member
7 Notch
8 Support wire
15, 20 Optical fiber cable
31 Optical fiber cable according to the present invention
32 Four optical fiber ribbon
33 Tension member
34 Support wire
35 Neck portion
36 Sheath
37 Notch

THE DETAILED DESCRIPTION OF THE EMBODIMENTS

The optical fiber cable according to the present invention will now be described in more detail with reference to the drawings. FIG. 1 is a cross-sectional view illustrating one embodiment of the optical fiber cable according to the present invention. As illustrated in FIG. 1, the optical fiber cable according to the present invention has, for example, a sheath 3 composed of a halogen-free flame retardant polyolefin, or more specifically, a halogen-free flame retardant polyethylene, coated around one strand of the so-called optical fiber 1, which has a resin coating composed of a UV-curable resin, thermosetting resin and the like around the periphery of one strand of glass optical fiber.

In FIG. 1, reference numerals 6, 6 denote a tension member having an outer diameter of about 0.5 mm made of, for example, aramid fiber bundles or FRP using aramid fibers as the reinforced fibers, positioned on either side of the optical fiber 1 (in FIG. 1, the top and bottom directions) at a certain distance from the optical fiber 1. However, these tension members 6, 6 are positioned so that their center is located roughly in the same plane as the center of the optical fiber 1. The tension members 6, 6 are used to protect the optical fiber, which has poor mechanical strength, when the optical fiber is subjected to external force in the longitudinal direction. Moreover, in FIG. 1, the distance from the center of the optical fiber 1 to the center of each tension member 6, 6 is roughly equal.

Further, reference numerals 7, 7 denote a notch optionally provided on either face of the outer surface opposing the sheath 3. It is convenient to provide these notches 7, 7 so that the sheath 3 can be easily split apart during cable installation, which allows the internal optical fiber 1 to be easily extracted.

Further, reference numeral 8 denotes an optionally-provided support wire made of FRP, galvanized steel wire and the like, having an outer diameter of 1.2 mm, for example. In the case of the optical fiber cable illustrated in FIG. 1, the center of the support wire 8 is positioned so as to roughly be in the same plane as the optical fiber 1 and the tension members 6, 6. Such an optical fiber cable is referred to as a so-called "self-supporting optical fiber cable". It is noted that optical fiber cables which are installed over very short distances do not have to have a support wire 8.

An optical fiber cable which does not have a support wire 8 has dimensions of about 3.1 mm in the long-side direction, and about 2.0 mm in the short-side direction.

The characteristics of a first working example of the embodiment of the optical fiber cable according to the present invention illustrated in FIG. 1 are characterized by the shore D hardness of sheath 3 and the minimum distance L from the surface of the optical fiber 1 to the outer surface of sheath 3 are limited in the below-described manner. Specifically, the first working example is characterized by the features, which were found by the below-described test, that to stop the egg-laying behavior of cicadas, the shore D hardness of sheath 3 is set to 55 or more, so that even if a cicada perches on the sheath surface it is difficult for the cicada to pierce the sheath 3 with its ovipositor, and that the minimum distance L from the surface of the optical fiber 1 to the outer surface of the sheath 3 is set to be greater than 0.3 mm, so that even if a cicada pierces the sheath 3 with its ovipositor, because the sheath 3 is hard, the cicada cannot dig more than 0.3 mm into the sheath 3. The present inventors simultaneously discovered that even if the shore D hardness is set to 57 or more and the minimum distance L from the surface of the optical fiber 1 to the outer surface of the sheath 3 is set to be greater than 0.2 mm, even if a cicada pierces the sheath 3 with its ovipositor, because the sheath 3 has been made much harder, the cicada cannot dig more than 0.2 mm into the sheath 3, so that the optical fiber does not suffer any damage. The contents of the test will now be described below.

In this test, first, an optical fiber cable having a cross-section like that illustrated in FIG. 1 was cut into 13 cm lengths. Twenty pairs of these strands were prepared, each pair consisting of two strands, for a total of 40 strands. In each test, one pair (two strands) of optical fiber cables and a cicada were left together inside a vessel. After 1 day had passed, the number of incisions which remained on the cable resulting from the egg-laying behavior of the cicada (hereinafter, "egg-laying incisions"), the maximum value and average value of the depth thereof, and the presence of any damage to the optical fiber were examined for each cable having a respective shore D hardness and L. These results are shown in Table 1.

TABLE 1

| Sheath shore D hardness | L (mm) | Number of cable strands | Total number of egg-laying incisions | Maximum value of egg-laying incision depth (mm) | Average value of egg-laying incision depth (mm) | Presence of damage to the optical fiber |
|---|---|---|---|---|---|---|
| 52 | 0.4 | 40 | 54 | 7.1 | 3.1 | Yes |
| "  | 0.5 | 40 | 48 | 9.5 | 3.5 | Yes |
| 55 | 0.4 | 40 | 35 | 0.3 | 0.1 | No |
| "  | 0.5 | 40 | 36 | 0.3 | 0.1 | No |
| 57 | 0.4 | 40 | 20 | 0.2 | 0.1 | No |
| "  | 0.5 | 40 | 33 | 0.1 | 0.1 | No |
| 62 | 0.4 | 40 | 38 | 0.2 | 0.1 | No |
| "  | 0.5 | 40 | 36 | 0.2 | 0.1 | No |

The letter "L" used in Table 1 denotes the L indicated in FIG. 1, and specifically, the minimum distance from the bottom of the notch 7 to the surface of the optical fiber 1 of the optical fiber cable illustrated in FIG. 1. From, for example, the shore D hardness of the sheath and the maximum value of the depth of the egg-laying incisions of Table 1, the far right column of Table 1 shows that by setting the shore D hardness of sheath 3 to 55 or more and the minimum distance L from the surface of the optical fiber 1 to the outer surface of the sheath 3 to be greater than 0.3 mm, or by setting the shore D hardness of sheath 3 to 57 or more and the minimum distance L from the surface of the optical fiber 1 to the outer surface of the sheath 3 to be greater than 0.2 mm, damage to the optical fiber can be eliminated.

By virtue of not having to use a protective tape, the thus-formed optical fiber cable according to the present invention illustrated in FIG. 1 has improved manufacturability compared with a conventional optical fiber cable in which a protective tape is provided inside the sheath 3. Further, because the location of the protective tape cannot be externally confirmed, there is also the problem that it is difficult to guarantee the reliability of the cable over its entire length in the longitudinal direction. In contrast, for the optical fiber cable according to the present invention, the egg-laying behavior of cicadas can be reliably stopped over the entire length of the cable in the longitudinal direction. It is noted that the above-described shore D hardness is a value measured according to JIS K 7215 (Durometer hardness testing method of plastic).

Figure 2:
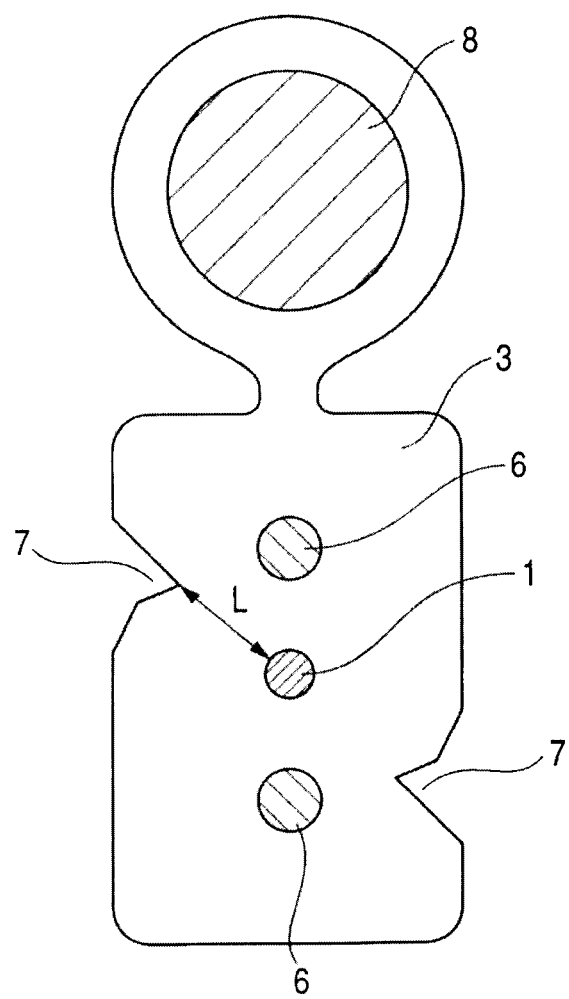
FIG. 2 is a cross-sectional view illustrating a modified embodiment of the optical fiber cable according to the present invention.

A modified aspect of the first working example of the embodiment of the optical fiber cable according to the present invention illustrated in FIG. 1 will now be described using FIGS. 2 to 4. Unlike the optical fiber cable illustrated in FIG. 1, in which the opposing notches 7, 7 are located directly opposite from each other while sandwiching the middle of the optical fiber 1 therebetween, the cable illustrated in FIG. 2 is characterized in that the notches 7, 7 are located differently with respect to the center of the optical fiber 1. It is noted that for this cable the minimum distance L from the surface of the optical fiber 1 to the outer surface of the sheath 3 indicates the distance from the tip part (bottom) of the notch 7 to the surface of the optical fiber 1. Forming the notches in this way has the advantages that the notches 7 can be made deeper while ensuring the minimum distance L from the surface of the optical fiber 1 to the outer surface of the sheath 3, and the sheath 3 can be split more easily, which makes it easier to extract the optical fiber 1. For this cable as well, by setting the shore D hardness of sheath 3 to 55 or more, and the minimum distance L from the surface of the optical fiber 1 to the outer surface of the sheath 3 to be greater than 0.3 mm, or by setting the shore D hardness of sheath 3 to 57 or more and the minimum distance L from the surface of the optical fiber 1 to the outer surface of the sheath 3 to be greater than 0.2 mm, damage to the optical fiber due to the egg-laying behavior of cicadas can be eliminated.

Figure 3:
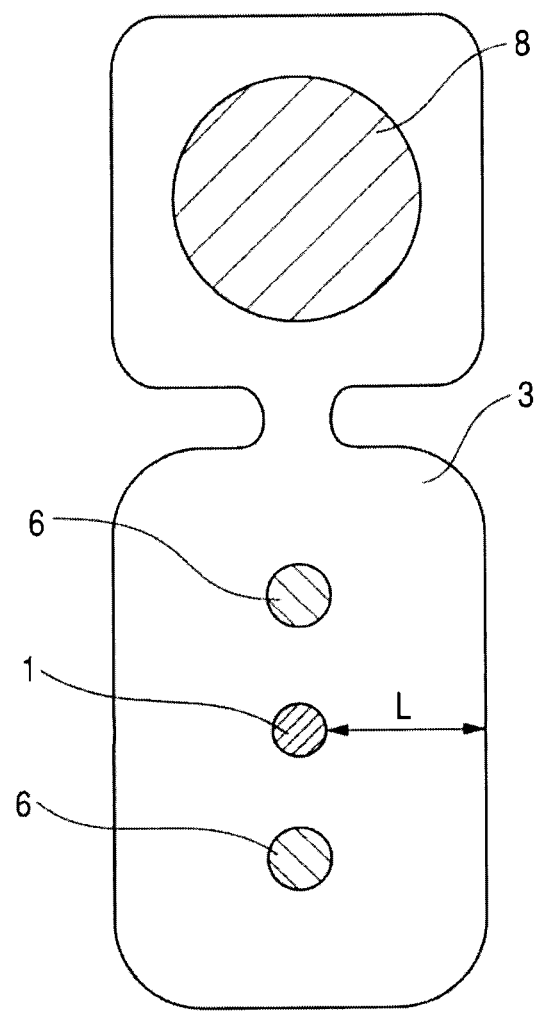
FIG. 3 is a cross-sectional view illustrating a modified embodiment of the optical fiber cable according to the present invention.

The cable illustrated in FIG. 3 is characterized in that the shape of the sheath of the support wire 8 has a rectangular cross-section and that a notch 7 is not formed. The other features, specifically, the value of the shore D hardness and the minimum distance L from the surface of the optical fiber 1 to the outer surface of the sheath 3, are both set in the same ranges as the above-described optical fiber cables of FIGS. 1 and 2. Thus, the advantages are the same as those of the above-described optical fiber cables illustrated in FIGS. 1 and 2. Since this cable does not have a notch 7, the minimum distance from the surface of the optical fiber 1 to the outer surface of the sheath 3 becomes L. The optical fiber cable illustrated in FIG. 3 also has the advantage that it can be easily wound onto a drum because the side face formed between the support wire 8 side and the cable body side is planar.

Figure 4:
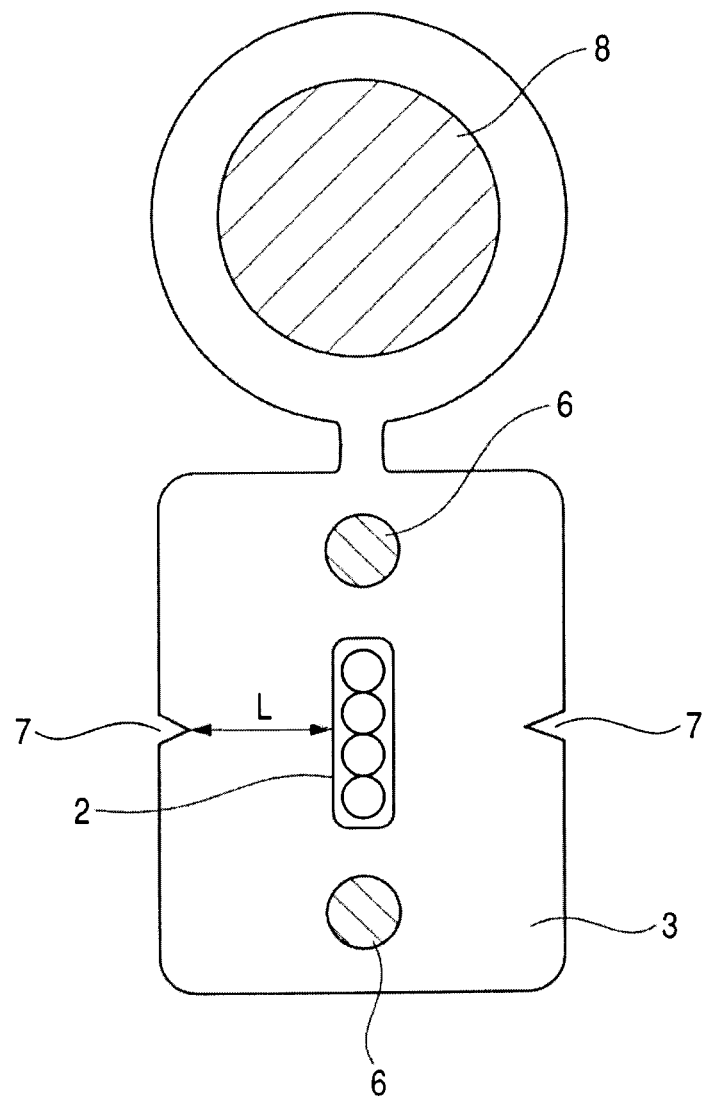
FIG. 4 is a cross-sectional view illustrating a modified embodiment of the optical fiber cable according to the present invention.

The optical fiber cable illustrated in FIG. 4 is characterized by using a so-called optical fiber ribbon 2, in which a plurality of optical fibers are lined up flat in parallel, and then collectively coated with a resin coating, instead of the single optical fiber 1 illustrated in FIGS. 1 to 3. The other features, i.e., the values of the shore D hardness and the minimum distance L from the optical fiber 1 to the outer surface of the sheath 3, are both set in the same range as the cable illustrated in FIG. 1, and the advantages are also essentially the same. It is noted that although in FIGS. 1 to 4 only one strand of the optical fiber 1 or optical fiber ribbon 2 is used, a plurality of strands may optionally also be used.

As described above, a conventional optical fiber cable is buried in the sheath 3 and cannot be seen from the outside. Further, such an optical fiber cable uses a protective tape which is in the cable longitudinal direction and whose position and orientation is difficult to control. In contrast, the optical fiber cable according to the present invention has defined values for the shore D hardness of sheath 3, whose cable longitudinal direction is easy to control during production, and the minimum distance L from the optical fiber 1 to the outer surface of the sheath 3. Therefore, the preventative effects against the egg-laying behavior of cicadas can be obtained easily and reliably over the entire length of the cable in the longitudinal direction.

An example of a method to adjust the shore D hardness of sheath 3 to within the defined range is to adjust the blended ratio of the halogen-free flame retardant polyolefin and the polypropylene when blending these materials together. By increasing the blended ratio of polypropylene, the shore D hardness of sheath 3 can be increased. Considering manufacturability and the handling properties of the cable, the shore D hardness of sheath 3 is preferably not greater than 70. Further, the larger the minimum distance L from the surface of the optical fiber 1 to the outer surface of the sheath 3 is, the smaller the effects on the optical fiber 1 are even if cicadas lay eggs. However, as a result, this means that the outer diameter of the cable increases, which causes the weight of the cable to become heavier. Therefore, the minimum distance L is usually preferably less than 1.6 mm.

A second working example of the embodiment of the optical fiber cable according to the present invention illustrated in FIG. 1 will now be described. The characteristics of the second working example of the optical fiber cable according to the present invention are the features that the coefficient of friction of the surface of sheath 3 and the shore D hardness of sheath 3 are defined in the following manner. Specifically, to stop the egg-laying behavior of cicadas, the coefficient of friction of the surface of sheath 3 is set to 0.45 or less, whereby a cicada finds it difficult to perch on the surface of sheath 3, and the shore D hardness of sheath 3 is set to 57 or more, whereby even if a cicada does perch on the sheath surface, it is difficult for the cicada to pierce the sheath 3 with its ovipositor. Alternatively, the coefficient of friction of the surface of sheath 3 is set to 0.47 or less and the shore D hardness of sheath 3 is set to 62 or more. In the second working example, a test was carried out with the minimum distance L set to 0.25 mm. Generally, if a cable is produced with L set to less than 0.2 mm, the sheath breaks at a part of the cable in the longitudinal direction, whereby the sheath may peel away from the optical fiber. Thus, 0.2 mm is the lowest value that L can become.

To even more reliably stop the egg-laying behavior of cicadas, a characteristic of the second working example is the feature of setting the coefficient of friction of the surface of sheath 3 to 0.45 or less and the shore D hardness of sheath 3 to 62 or more. If set in this manner, a cicada slips more easily on the surface of sheath 3, thus making it more difficult for the cicada to perch there. Further, even should the cicada perch on the cable surface, since the sheath 3 is harder, piercing it with the ovipositor is much more difficult. As a result, optical fiber damage caused by the egg-laying behavior of cicadas, and the risk of increased transmission loss can be even more reliably reduced over the entire length of the cable in the longitudinal direction.

By virtue of not having to use a protective tape, the thus-formed optical fiber cable according to the present invention illustrated in FIG. 1 has improved manufacturability compared with a conventional optical fiber cable in which a protective tape is provided inside the sheath 3. Further, because the location of the protective tape cannot be externally confirmed, there is also the problem that it is difficult to guarantee the reliability of the cable over its entire length in the longitudinal direction. In contrast, for the optical fiber cable according to the present invention, the egg-laying behavior of cicadas can be reliably stopped over the entire length of the cable in the longitudinal direction.

Figure 5:
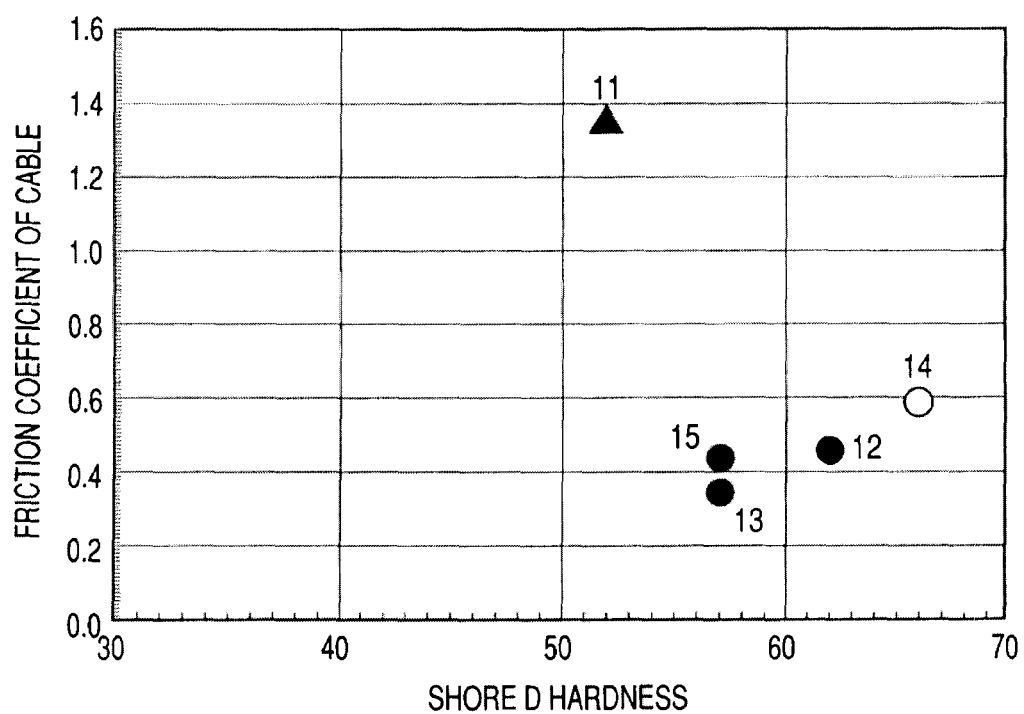
FIG. 5 is a graph illustrating the effect that the relationship between the sheath surface coefficient of friction and shore D hardness has on the incidence of damage to the optical fiber due to cicadas in the optical fiber cable illustrated in FIG. 1.

The basis for deciding the coefficient of friction of the surface of sheath 3 and the shore D hardness of sheath 3 in the above-described manner will now be described in more detail. FIG. 5 illustrates the results of investigating how the coefficient of friction of the surface of sheath 3 and the shore D hardness of sheath 3 effect the egg-laying behavior of a cicada. In FIG. 5, the vertical axis represents the coefficient of friction of the surface of sheath 3 (in FIG. 5, simply expressed as "Coefficient of friction"), and the horizontal axis represents the shore D hardness of sheath 3 (in FIG. 5, simply expressed as "Shore D hardness"). In FIG. 5, the black triangular mark 11 indicates that a large incidence of damage could be seen on the optical fiber, the white circle 14 indicates that only a small incidence of damage could be seen, and the black circles 12, 13 and 15 indicate that absolutely no damage was observed. Further, the numerals given to the respective marks in FIG. 5 represent the sample name described in the following Table 2. Further, in the "Damage" column on the far right of Table 2, "X" indicates that a large incidence of damage could be seen, "Δ" indicates that a only a small incidence of damage could be seen, and "O" indicates that absolutely no damage was observed, respectively.

TABLE 2

| Sample name | Shore D hardness | Coefficient of friction | Damage |
|---|---|---|---|
| 11 | 52 | 1.35 | X |
| 12 | 62 | 0.47 | O |
| 13 | 57 | 0.34 | O |
| 14 | 66 | 0.59 | Δ |
| 15 | 57 | 0.45 | O |

Figure 6:
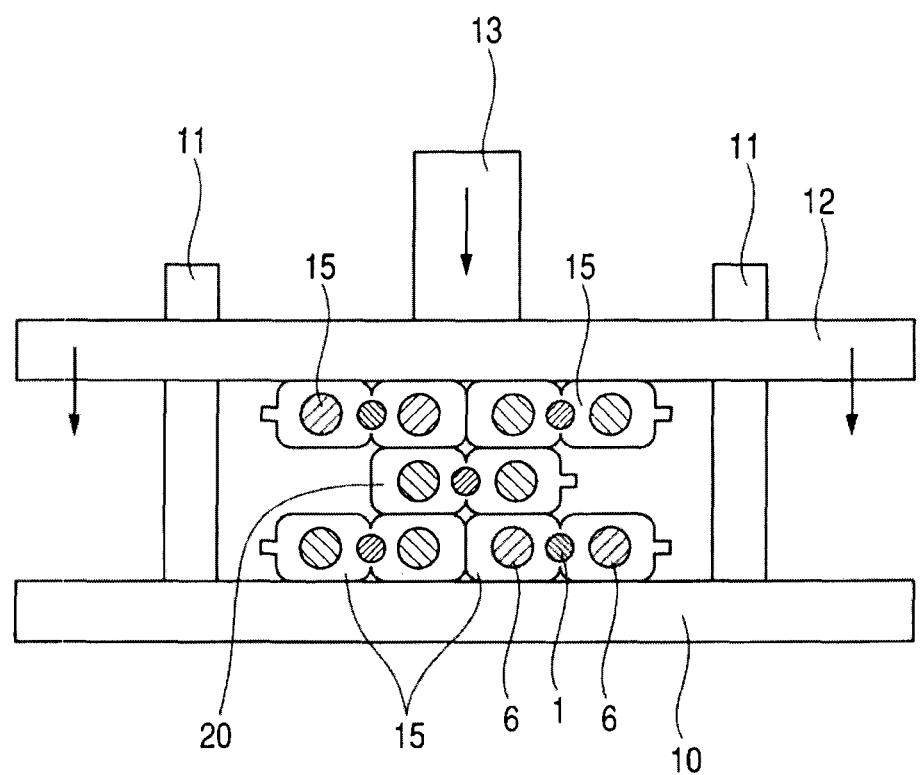
FIG. 6 is a schematic diagram illustrating a method for measuring the coefficient of friction of the sheath surface.

Moreover, the coefficient of friction of the surface of sheath 3 was determined by the method illustrated in FIG. 6. Specifically, two optical fiber cables 15 150 mm in length which had had the support wire portion of the optical fiber cable illustrated in FIG. 1 cut off were adjacently placed on a base 10 so as to be parallel to each other. An optical fiber cable 20 300 mm in length serving as the sample for measuring the coefficient of friction, which also had had its support wire portion cut off, was stacked in a staggered manner onto the two optical fiber cables 15. Two more of the above-described optical fiber cables 15, 15 150 mm in length were further stacked in a staggered manner onto this test (measurement sample) optical fiber cable 20. Then, a retaining plate 12 which slides up and down was mounted parallel to the base 10 while being guided by a plurality of slide guides 11 arranged perpendicularity on the base 10. The same material was used for the optical fiber cables 15 and 20.

Subsequently, a constant load of 19.6N was applied on the retaining plate 12 in the arrow direction by a weight 13. In this state, the test optical fiber cable 20 was pulled out in a front direction at a rate of 100 mm/min. The coefficient of friction of the surface of sheath 3 was measured by dividing the magnitude of this pull-out force by the load of 19.6N. The testing environment was a temperature of 23±2° C. and a humidity of 50±10%. The optical fiber cables 15 and 20 were replaced after each test was completed. On the other hand, the shore D hardness of sheath 3 was determined by the measurement method specified in JIS K 7215 (Durometer hardness testing method of plastic).

In FIG. 5, absolutely no damage of the optical fiber 1 as a result of cicadas was seen, as shown by the black circle 13, where the coefficient of friction of the surface of sheath 3 was 0.34 or less and the shore D hardness of sheath 3 was 57 or more, or by the black circle 12, where the coefficient of friction of the surface of sheath 3 was 0.47 or less and the shore D hardness of sheath 3 was 62 or more, or by the black circle 15, where the coefficient of friction of the surface of sheath 3 was 0.45 or less and the shore D hardness of sheath 3 was 57 or more. Therefore, it can be seen that adverse effects on the optical fiber 1 resulting from the egg-laying behavior of cicadas can be prevented by setting the coefficient of friction of the surface of sheath 3 to 0.34 or less and the shore D hardness of sheath 3 to 57 or more, or the coefficient of friction of the surface of sheath 3 to 0.47 or less and the shore D hardness of sheath 3 to 62 or more, or the coefficient of friction of the surface of sheath 3 to 0.45 or less and the shore D hardness of sheath 3 to 57 or more.

As an even more reliable range, judging from the three black circles 12, 13 and 15 in FIG. 5, damage to the optical fiber 1 as a result of cicadas can be more reliably and completely prevented by setting the shore D hardness of sheath 3 to 62 or more and the coefficient of friction of that surface to 0.34 or less or 0.45 or less.

A modified aspect of the second working example of the embodiment of the optical fiber cable according to the present invention illustrated in FIG. 1 will now be described using FIGS. 2 to 4. It is noted in these modified embodiments the test was also carried out with the minimum distance L set to 0.25 mm. For the cable illustrated in FIG. 2 as well, absolutely no damage to the optical fiber 1 as a result of cicadas was seen if the coefficient of friction of the surface of sheath 3 was set to 0.34 or less and the shore D hardness of sheath 3 to 57 or more, or the coefficient of friction of the surface of sheath 3 was set to 0.47 or less and the shore D hardness of sheath 3 to 62 or more, or the coefficient of friction of the surface of sheath 3 was set to 0.45 or less and the shore D hardness of sheath 3 to 57 or more. Further, to make these effects even more reliable, it is preferable to set the shore D hardness of sheath 3 to 62 or more and the coefficient of friction of that surface to 0.34 or less or 0.45 or less, since damage to the optical fiber 1 as a result of cicadas can be even more reliably prevented.

The cable illustrated in FIG. 3 has the same coefficient of friction value of the surface of sheath 3, the same shore D hardness value of sheath 3, and even the same effects as for the above-described optical fiber cables illustrated in FIGS. 1 and 2. In the case of the optical fiber cable illustrated in FIG. 3, there is also the advantage of easy winding onto a drum due to the thickness of the side face formed between the support wire 8 side and the cable body side and the fact that such side face is in the same plane as the body side.

The optical fiber cable illustrated in FIG. 4 uses the so-called optical fiber ribbon 2, in which a plurality of optical fibers are lined up flat in parallel and then collectively coated with a resin coating, instead of the single optical fiber 1 illustrated in FIGS. 1 to 3. The other features, i.e., the shore D hardness and coefficient of friction of the surface of sheath 3, as well as the advantages, are essentially the same as in FIG. 1. It is noted that although in FIGS. 1 to 4 only one strand of the optical fiber 1 or optical fiber ribbon 2 is used, a plurality of strands may optionally also be used.

As described above, in contrast to a conventional optical fiber cable, which cannot be seen from the outside because the cable is buried in the sheath 3, and which uses a protective tape, the optical fiber cable according to the present invention does not use a protective tape. Thus, manufacture is simple, and the preventative effects against the egg-laying behavior of cicadas can be obtained reliably over the entire length of the cable in the longitudinal direction.

To adjust the coefficient of friction of the surface of sheath 3 to within the defined range, the amount of a fatty acid amide lubricant, specifically, erucic acid amide, oleic acid amide or other such lubricant, added to the sheath 3 material may be changed. By adding a large amount of such lubricant, the coefficient of friction of the surface of sheath 3 can be decreased. Considering manufacturability and the handling properties of the cable, the coefficient of friction of the surface of sheath 3 is preferably not less than 0.2. An example of a method to adjust the shore D hardness of sheath 3 is to adjust the blended ratio of the halogen-free flame retardant polyolefin and the polypropylene, which is harder than the polyolefin, when adding these materials together. By increasing the proportion of polypropylene, the shore D hardness of sheath 3 can be increased. Considering manufacturability and the handling properties of the cable, the shore D hardness of sheath 3 is preferably not greater than 70.

Test Example 1

Figure 7:
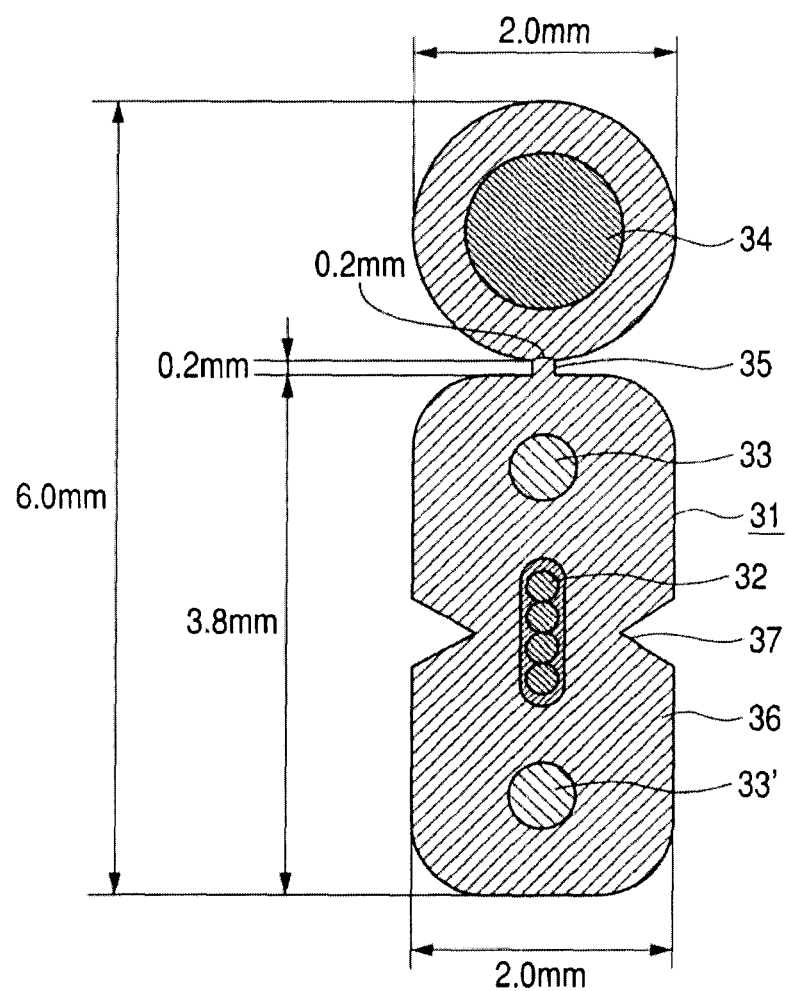
FIG. 7 is a schematic cross-sectional view illustrating a test example of an embodiment of the optical fiber cable according to the present invention.
Figure 8:
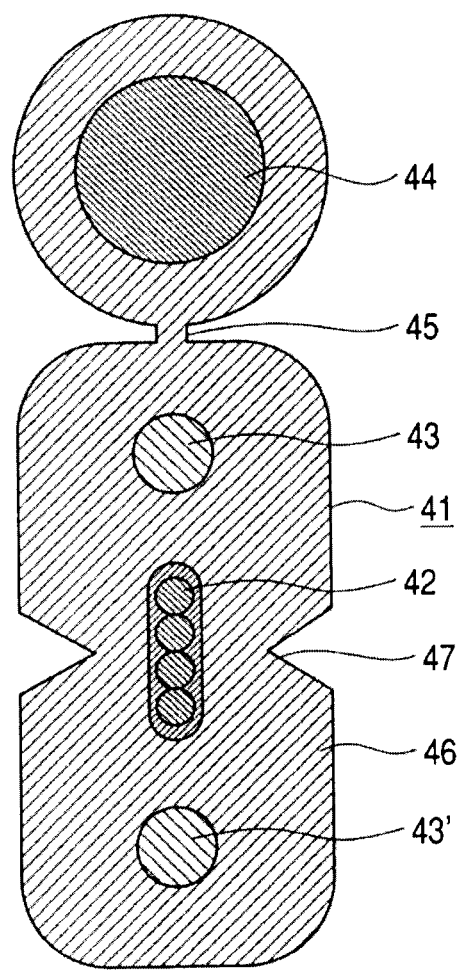
FIG. 8 is a schematic cross-sectional view of a conventional optical fiber cable.

First test examples of the above-described embodiment will now be described using FIG. 7. An optical fiber cable 31 according to the present invention has a four optical fiber ribbon 32, a 1.2 mm-diameter support wire 34 made of steel wire, and two 0.5 mm-diameter tension members 33, 33' made of aramid FRP. These are collectively coated by a sheath 36 having a neck portion 35. The long side of the sheath 36 excluding the support wire is 3.8 mm, and the short side is 2.0 mm. The neck portion 35 has a length of 0.2 mm and a thickness of 0.2 mm. The outer diameter of the sheath 36 coating the support wire is 2.0 mm, and the height of the whole optical fiber cable 31 is 6.0 mm. Further, to facilitate extraction of the internal four optical fiber ribbon 32 by breaking the sheath 36, a notch 7 is provided on the sheath 36. So that material of the sheath 36 has excellent flame retardance, low friction properties, and wear resistance, the sheath 36 is formed by a below-described flame retardant composition. The size and shape of the optical fiber cord or cable according to the present invention are not especially limited, and may be appropriately determined according to the purpose.

Each of the components of the flame retardant composition (P) used for the sheath material of the optical fiber cord or cable as the first test example of the above-described embodiment will now be described.

Ethylene/α-Olefin Copolymer (a)

The ethylene/α-olefin copolymer is preferably a copolymer of ethylene and an α-olefin having 4 to 12 carbon atoms. Specific examples of the α-olefin include 1-butene, 1-hexene, 4-methyl-1-pentene, 1-octene, 1-decene, 1-dodecene and the like. Examples of the ethylene/α-olefin copolymer include LLDPE (linear low-density polyethylene), LDPE (low density polyethylene), VLDPE (very low density polyethylene), EBR (ethylene-butadiene rubber) and an ethylene/α-olefin copolymer synthesized in the presence of a single site catalyst. Among these, the ethylene/α-olefin copolymer synthesized in the presence of a single site catalyst is preferable. The density of the ethylene/α-olefin copolymer is preferably 0.940 g/cm$^3$ or less, more preferably 0.930 g/cm$^3$ or less, and particularly preferably 0.928 g/cm$^3$ or less. There is no particular lower limit to the density, but not less than 0.875 g/cm$^3$ is preferable. Further, preferably the ethylene/α-olefin copolymer has a melt flow index (ASTM D-1238) of 0.5 to 30 g/10 min. Examples of the ethylene/α-olefin copolymer in the present invention include a copolymer synthesized in the presence of a single site catalyst, and a common linear low density polyethylene or very low density polyethylene. Among them, the copolymer synthesized in the presence of a single site catalyst is preferable. As the production method for this copolymer, a known method described, for example, in Japanese Patent Application Laid-Open No. H06-306121 or National Publication of International Patent Application No. H07-500622 can be used. The single site catalyst is a catalyst whose polymerization active point is single and which has a high polymerization activity. A single site catalyst is also called a "metallocene catalyst" or a "Kaminsky catalyst". An ethylene/α-olefin copolymer synthesized using this catalyst is characterized in having a narrow molecular distribution and composition distribution. The ethylene/α-olefin copolymer synthesized in the presence of such a single site catalyst has, for example, a high tensile strength, tear strength and impact strength. Therefore, when it is used in a halogen-free flame retardant material (an optical fiber cable sheath material) that is required to be highly filled with a metal hydrate, there is the advantage that the lowering of the mechanical characteristics due to the highly filled metal hydrate can be reduced. However, compared with using a usual ethylene/α-olefin copolymer, using an ethylene/α-olefin copolymer synthesized using a single site catalyst causes an increase in melt viscosity and a decrease in melt tension, causing a problem with moldability. In this regard, there are copolymers having improved moldability as a result of introducing long-chain branches using an asymmetric catalyst as the single site catalyst (Constrained Geometory Catalystic Technology) or forming two peaks in the molecular weight distribution by connecting two polymerization tanks at the time of the polymerization (Advanced Performance Terpolymer). Preferably, the ethylene/α-olefin copolymer synthesized in the presence of a single site catalyst used in the present invention is such a copolymer having the improved moldability. Commercially available examples thereof include "Affinity" and "Engage" (trade names) from Dow Chemical Co., "Kernel" (trade name) from Japan Polyethylene Corporation, "Evolue" (trade name) from Mitsui Sumitomo Polyolefin Co., Ltd., and Umerit (trade name) from Ube-Maruzen Polyethylene Co., Ltd. The content of the ethylene/α-olefin copolymer in the present invention is 90 to 50 mass %, and preferably 80 to 50 mass %, of the above-described thermoplastic resin (A).

Polypropylene Resin (b)

Examples of the polypropylene resin which can be used in the present invention include a homopolypropylene, an ethylene/propylene random copolymer, an ethylene/propylene block copolymer, a copolymer of propylene with a small amount of another α-olefin (e.g., 1-butene, 1-hexene, and 4-methyl-1-pentene), and a copolymer of propylene and ethylenepropylene (TPO). Here, "ethylene/propylene random copolymer" means one in which the content of the ethylene component is in a range of about 1 to 4 mass %, and "ethylene/propylene block copolymer" means one in which the content of the ethylene component is in a range of about 5 to 20 mass %. The content of the polypropylene resin in the present invention is 5 to 40 mass %, and preferably 10 to 35 mass %, of the above-described thermoplastic resin (A).

Polyolefin Modified by an Unsaturated Carboxylic Acid or its Derivative (c-1) and Ethylene-(Meth)Acrylic Acid Copolymer (c-2)

The "polyolefin modified by an unsaturated carboxylic acid or its derivative" (hereafter, sometimes collectively referred to as "unsaturated carboxylic acid") refers to a resin which has undergone graft polymerization by modifying a polyolefin with an unsaturated carboxylic acid or its derivative. Examples of the unsaturated carboxylic acid include acrylic acid, methacrylic acid, maleic acid, itaconic acid, fumaric acid and the like. Examples of a derivative of the unsaturated carboxylic acid include an acrylic ester, a methacrylic acid ester, a maleic acid monoester, a maleic acid diester, maleic anhydride, an itaconic acid monoester, an itaconic acid diester, itaconic acid anhydride, a fumaric acid monoester, a fumarate diester, anhydrous fumaric acid and the like. Examples of the polyolefin include polyethylene (linear polyethylene, ultra low density polyethylene, high density polyethylene), polypropylene (homopolypropylene, a propylene-ethylene random copolymer, a propylene-ethylene block copolymer, a copolymer of propylene and a small amount of another α-olefin (e.g. 1-butene and 1-hexene, 4-methyl-1-pentene)), a copolymer of ethylene and an α-olefin, an ethylene-vinylacetate copolymer, an ethylene-(meth)acrylic ester copolymer, a styrene copolymer and the like. Modification of the polyolefin can be performed, for example, by heating and kneading a polyolefin, an unsaturated carboxylic acid and the like in the presence of an organic peroxide. The amount modified by the unsaturated carboxylic acid etc. is preferably 0.5 to 15 mass %. Specific examples of the polyolefin modified by an unsaturated carboxylic acid etc. include "Polybond" (trade name, manufactured by Crompton), Adtex (trade name, manufactured by Japan Polyethylene Corporation), Admer (trade name, manufactured by Mitsui Chemicals, Inc.), Kraton (trade name, manufactured by Kraton JSR Elastomers K.K.) and the like. Examples of the ethylene-(meth)acrylic acid copolymer according to the present invention include an ethylene-acrylic acid copolymer and an ethylene-methacrylic acid copolymer. Specific examples include Nucrel (trade name, Du Pont-Mitsui Polychemicals Co., Ltd.). In the present invention, the component (c-1) and/or component (c-2) may be used either as one kind or in combination of two kinds of more. In the present invention, by chemically bonding with the below-described magnesium hydroxide during molding, the component (c-1) and component (c-2) can obtain high flame retardance, mechanical properties and abrasion resistance. These excellent effects are especially marked when the polyolefin and ethylene (meth)acrylic acid copolymer modified by acrylic acid or methacrylic acid are used. Therefore, in the present invention it is more desirable to use or combine the polyolefin and ethylene (meth)acrylic acid copolymer modified by acrylic acid or methacrylic acid as the components (c-1) and/or (c-2).

The content of the component (c-1) and/or component (c-2) in the present invention is 0 to 20 mass %, and preferably 0 to 15 mass %, of the above-described thermoplastic resin (A). If this content is exceeded, stretch is markedly reduced.

Styrene Elastomer (d)

Styrene Elastomer

The styrene elastomer in the present invention is a block copolymer or a random copolymer composed of a styrene polymer block S and at least one polymer block B having a conjugated diene compound as a main component, or a product obtained by hydrogenation of such block or random copolymer. Alternatively, the styrene elastomer may be a mixture thereof. Examples of the styrene elastomer include a copolymer of a vinyl aromatic compound—conjugated diene compound having a S—B—S, B—S—B—S, S—B—S—B—S, $S_{m1}$—$B_{n1}$—$S_{m2}$—$B_{n2}$ etc. structure, or a product obtained by hydrogenation of such copolymer.

Examples of the conjugated diene compound include one kind or more selected from butadiene, isoprene, 1,3-pentadiene, 2,3-dimethyl-1,3-butadiene and the like. Among these, preferred are butadiene, isoprene and a combination thereof. Specific examples of the above-described styrene elastomer include HSBR (hydrogenated styrene-butadiene elastomer), SBS (styrene-butadiene-styrene block copolymer), SIS (styrene-isoprene-styrene block copolymer), SEBS (styrene-ethylene/butadiene-styrene block copolymer), SEPS (styrene-ethylene/propylene-styrene block copolymer) and the like. Modified products of these may also be used. Examples of the styrene copolymer modified by an unsaturated carboxylic acid include Kraton 1901FG (manufactured by Kraton Polymers Japan Ltd.). The content of the component (d) in the present invention is 0 to 30 mass %, and preferably 0 to 15 mass %, of the above-described thermoplastic resin (A).

Ethylene Vinyl Acetate Copolymer (e-1) and Ethylene-(Meth)Acrylate Copolymer (e-2)

A copolymerization product of ethylene and vinyl acetate can be used for the ethylene-vinyl acetate copolymer. Examples thereof include Evaflex (trade name, manufactured by Du Pont-Mitsui Polychemicals Co., Ltd.), Ultracene (trade name, manufactured by Tosoh Corporation) and the like. Further, examples of the ethylene-(meth)acrylate copolymer include ethylene-ethylacrylate copolymer (EEA), ethylene-methylacrylate copolymer (EMA), ethylene-butylacrylate copolymer (EBA), ethylene-methylmethacrylate copolymer (EMMA) and the like. Specific examples include NUC (trade name, manufactured by Nippon Unicar Company Limited).

Metal Hydrate (B)

Examples of the metal hydrate in the flame retardant composition (P) used in the present invention include aluminum hydroxide, magnesium hydroxide and the like. From the perspective of flame retardance, magnesium hydroxide is preferred. In the present invention magnesium hydroxide which is usually commercially available may be used. In the present invention, the magnesium hydroxide may be used without any treatment, or after subjecting to a surface treatment. Examples of the surface treatment include fatty acid treatment, phosphoric acid treatment, titanate treatment, treatment with a silane coupling agent and the like. From the standpoint of reactivity with the resin component (A), in the present invention it is preferred to use a product that was not treated or which was treated using a silane coupling agent. The silane coupling agent in the present invention preferably has a vinyl group, a methacryloxy group, a glycidyl group or an amino group on its end. Specific examples include vinyltrimethoxysilane, vinyltriethoxysilane, glycidoxypropyltrimethoxysilane, glycidoxypropyltriethoxysilane, glycidoxypropylmethyldimethoxysilane, methacryloxypropyltrimethoxysilane, methacryloxypropyltriethoxysilane, methacryloxypropylmethyldimethoxysilane, mercaptopropyltrimethoxysilane, mercaptopropyltriethoxysilane, aminopropyltriethoxysilane, aminopropyltrimethoxysilane, N-(β-aminoethyl)-γ-aminopropyltripropylmethyldimethoxysilane, N-(β-aminoethyl)-γ-aminopropyltripropyltrimethoxysilane and the like. Among these, vinyltrimethoxysilane, vinyltriethoxysilane, methacryloxypropyltriethoxysilane, methacryloxypropylmethyldimethoxysilane and the like are preferred. Although the method for surface treatment with a silane coupling agent can be carried out by a commonly used method, the magnesium hydroxide may also be obtained by subjecting magnesium hydroxide which has not been surface treated in advance to dry-blending, wet processing, blending with the silane coupling agent during kneading and the like. The silane coupling agent may be appropriately added in an amount sufficient for the surface treatment. Specifically, however, the blended content of the used silane coupling agent is 0.1 to 2.5 mass %, preferably 0.2 to 1.8 mass %, and more preferably 0.3 to 1.0 mass %, based on the magnesium hydroxide. Further, magnesium hydroxide which has already undergone silane coupling agent surface treatment can be acquired. Specific examples of magnesium hydroxide which has been surface treated with a silane coupling agent include Kisuma 5L, Kisuma 5N and Kisuma 5P (all trade names, manufactured by Kyowa Chemical Industry Co., Ltd.) and the like. Further, examples of untreated magnesium hydroxide include Kisuma 5 (trade name, manufactured by Kyowa Chemical Industry Co., Ltd.), Magnifin H5 (trade name, manufactured by Albemarle Corporation) and the like. In the present invention, in the case of treating the magnesium hydroxide with a silane coupling agent, any one kind of silane coupling agent or a combination of two or more kinds may be used. In the present invention, magnesium hydroxide which has not been surface treated and magnesium hydroxide which has been surface treated may respectively be used alone or in combination. Magnesium hydroxides which have undergone different surface treatments may also be used together.

The blended content of the metal hydrate of the magnesium hydroxide and the like in the present invention is 60 to 150 parts by mass, preferably 70 to 140 parts by mass, and more preferably 90 to 120 parts by mass, based on 100 parts by mass of the resin component. If the blended content is too low, there is a problem with flame retardance, while if the blended content is too high, stretch is reduced, mechanical strength is markedly reduced and low-temperature brittleness is reduced.

Red Phosphorus (C)

To maintain high flame retardance, it is preferable to include red phosphorus in the flame retardant composition (P). Powdered red phosphorus has excellent dispersibility, and good mechanical properties and flame retardance. Further, the red phosphorus is not used as is, but with an inorganic or organic coating. Further, the red phosphorus used in the present invention may have an average particle size of 3 to 9 μm. If the red phosphorus is larger than 9 μm, appearance and mechanical strength markedly deteriorate, while if the red phosphorus is smaller than 3 μm, the kneading step becomes much more difficult. The content of this red phosphorus is preferably 0 to 10 parts by mass based on 100 parts by mass of the thermoplastic resin (A). If the content is too much, the mechanical properties deteriorate.

The flame retardant composition (P) used in the present invention may optionally include one or more selected from zinc stannate, zinc hydroxystannate and zinc borate to further improve flame resistance. The zinc stannate, zinc hydroxystannate and zinc borate used in the present invention preferably have an average particle size of not more than 5 μm, and more preferably not more than 3 μm. Specific examples of the zinc borate which can be used in the present invention include Alcanex FRC-500 ($2ZnO/3B_2O_3.3.5H_2O$), FRC-600 (both trade names, manufactured by Mizusawa Industrial Chemicals Ltd.) and the like. Further, examples of the zinc stannate ($ZnSnO_3$) and the zinc hydroxystannate ($ZnSn(OH)_6$) include Alcanex ZS, Alcanex ZHS (both trade names, manufactured by Mizusawa Industrial Chemicals Ltd.) and the like. The content of the zinc stannate, zinc hydroxystannate or zinc borate in the present invention is preferably 2 to 20 parts by mass, and more preferably 3 to 20 parts by mass, based on 100 parts by mass of the thermoplastic resin (A). If this content is too small, the effects of improved flame retardance are not exhibited, while if the content is too large, the mechanical properties, especially stretching, deteriorate, whereby the appearance when used as cord or cable worsens.

The flame retardant composition (P) used in the present invention may appropriately include various kinds of commonly-used additive agents to the extent that the purpose of the present invention is not harmed. Examples include an antioxidant, a metal deactivator, a flame retardant (aid), a filler, a lubricant and the like. Examples of the antioxidant include amine antioxidants, such as a polymer of 4,4'-dioctyl diphenylamine, N,N'-diphenyl-p-phenylene diamine and 2,2,4-trimethyl-1,2-dihydroquinoline; phenolic antioxidants, such as pentaerythrityl tetrakis(3-(3,5-di-t-butyl-4-hydroxyphenyl)propionate), octadecyl-3-(3,5-di-t-butyl-4-hydroxyphenyl)propionate and 1,3,5-trimethyl-2,4,6-tris(3,5-di-t-butyl-4-hydroxybenzyl)benzene; sulfur antioxidants, such as bis(2-methyl-4-(3-n-alkylthiopropionyloxy)-5-t-butylphenyl)sulfide, 2-mercaptobenzimidazole and its zinc salt, and pentaerythritol tetrakis(3-lauryl-thiopropionate) and the like. Examples of the metal deactivator include N,N'-bis(3-(3,5-di-t-butyl-4-hydroxyphenyl)propionyl)hydrazine, 3-(N-salicyloyl)amino-1,2,4-triazole and 2,2'-oxamidebis-(ethyl-3-(3,5-di-t-butyl-4-hydroxyphenyl)propionate) and the like. Examples of the flame retardant (aid) and filler include carbon, clay, zinc oxide, tin oxide, titanium oxide, magnesium oxide, molybdenum oxide, antimony trioxide, a silicone compound, quartz, talc, calcium carbonate, magnesium carbonate, white carbon and the like. Carbon (black) especially also has an effect of improving light resistance. Examples of the lubricant include hydrocarbons, fatty acids, fatty-acid-amides, esters, alcohols, metal soaps and the like. Among these, preferred are esters, alcohols, metal soaps and the like, which simultaneously exhibit internal slippage and external slippage, such as Wax E and Wax OP (both trade names, manufactured by Hoechst A.G.).

The flame retardant composition used for the optical fiber cord and cable according to the present invention can be obtained by melt-kneading the above-described respective components in a commonly-used kneading apparatus, such as a twin-screw kneader-extruder, a Banbury mixer, a kneader, a roll and the like.

Further, in the present invention, a crosslinked flame retardant resin composition of the present invention may be used as an outer covering layer. In one method for crosslinking, a polymer is bonded to a silane coupling agent, and then a crosslinking may be performed. In another method, while a portion of a resin is crosslinked by using a kneader and a Banbury mixer during preparing a resin composition, a polymer is coupled with a metal hydrate through a silane coupling agent.

In further method for crosslinking, after extrusion, the covering layer may be crosslinked. An electron beam irradiation crosslinking method and a chemical crosslinking method may be employed for performing a crosslinking. These methods may be performed according to common steps.

In the case of the electron beam crosslinking method, after a flame retardant resin composition of the present invention is extruded to form a covering layer, it is irradiated with an electron beam in a usual manner, to carry out the crosslinking. A dose of an electron beam is suitably 1 to 30 Mrad. For performing efficiently a crosslinking, a polyfunctional compound such as a methacrylate-type compound (such as trimethylol propane triacrylate), an allyl-type compound (such as triallyl cyanurate), a maleimide-type compound, divinyl-type compound and the like may be added to flame retardant resin composition constituting a covering layer as a crosslinking auxiliary agent.

When a chemical crosslinking method is employed, an organic peroxide is added as a crosslinking agent to a flame retardant resin composition, and after a covering layer is formed using an extrusion process, a crosslinking is performed by a heat treatment according to common steps.

The first test examples will now be described in more detail. However, the present invention is not limited to these examples. Further, unless otherwise noted, the term "parts" representing the composition indicates "parts by mass".

Test Examples and Comparative Examples

The content of the respective components of the resin composition of the first test examples is shown in Table 3, and that for the comparative examples is shown in Table 4. In Table 3, First working examples 1 to 7 according to the principles of the present invention are illustrated for the case where the content of the respective components of the resin composition is varied.

First, the respective components shown in the following Tables 3 and 4 were dry-blended at room temperature (23±2° C.), and the resultant mixture was melt-kneaded using a Banbury mixer to produce various flame retardant resin compositions. Next, using an extrusion coater, the already melt-kneaded flame retardant resin composition was coated by an extrusion method onto a four optical fiber ribbon, a 1.2 mm-diameter support wire made of steel wire, and two 0.5 mm-diameter tension members made of aramid FRP, to produce individual cables. The long side of the sheath excluding the support wire was 3.8 mm, and the short side was 2.0 mm. The neck portion had a length of 0.2 mm and a thickness of 0.2 mm. The outer diameter of the sheath coating the support wire was 2.0 mm, and the height of the whole optical fiber cable was 6.0 mm. The obtained optical fiber cables were evaluated as follows.

(Tension Test)
A No. 3 dumbbell test piece was fabricated based on JIS K 6723 from a 1.0 mm sheet formed by roll pressing the coated flame retardant resin composition in order to carry out the tension test. The test was carried out with marked intervals of 20 mm and a tension rate of 200 mm/min. A stretch of 300% or more and a tensile strength of 4.9 MPa is necessary.

(Hardness)
Type D Durometer hardness (hereinafter, referred to as "shore D hardness") was measured based on JIS K 7215 using a sheet formed by roll pressing the coated flame retardant resin composition. A shore D hardness of 57 or more is preferred so that even if a cicada perches on the cable (sheath) surface, because the sheath is hard, the cicada finds it difficult to pierce the sheath with its ovipositor.

(Low Friction Resistance)
The coefficient of kinetic friction was measured based on JIS K 7125. The same sheath material was used as the counter material. A coefficient of kinetic friction of 0.45 or less is preferred to make it more difficult for a cicada to perch on the cable (sheath) surface and make it more difficult to lay eggs.

(Flame Retardance)
The 60 degree incline flame test specified in JIS C 3005 was carried out, and a pass/fail determination was made.

(Appearance)
The surface appearance after extrusion was visually confirmed and evaluated. Test pieces having a good appearance were indicated with a circle, and those which had a poor appearance, such as a rough surface, and were not at a product level were indicated with a cross.

As the respective components, the following were used.

(01) Metallocene catalyst polyethylene (density: 926 kg/m$^3$); Trade name: Umerit 2525F; Manufacturer: Ube-Maruzen Polyethylene Co., Ltd.

(02) Metallocene catalyst polyethylene (density: 913 kg/m$^3$); Trade name: Umerit 1504F; Manufacturer: Ube-Maruzen Polyethylene Co., Ltd.

(03) Random polypropylene (R—PP); Trade name: PB22A; Manufacturer: SunAllomer Ltd.

(04) Maleic acid modified polypropylene reactor thermoplastic olefin (TPO); Acrylic acid modified product of Catalloy Q300F; (Manufacturer: Sunallomer Ltd.) Maleic acid modified content: 1.7 mass %

(05) Maleic acid modified polyethylene; Trade name: L-6100M; Manufacturer: Japan Polyethylene Corporation; Maleic acid modified content: 1 mass %

(06) Ethylene-methacrylic acid copolymer Trade name: Nucrel N$_{12}$O$_7$C; Manufacturer: Du Pont-Mitsui Polychemicals Co., Ltd. Methacrylic content: 12 mass %

(07) Maleic acid modified styrene elastomer; Trade name: Kraton 1901FG; Manufacturer: Kraton Polymers Japan Ltd.; Maleic acid modified content: 1.7 mass %

(08) Ethylene-ethylacrylate copolymer; Trade name: NUC-6510; Manufacturer: Nippon Unicar Company Limited

(09) Fatty-acid-treated magnesium hydroxide silane-treated magnesium hydroxide

(10) Silane-treated magnesium hydroxide

(11) Red phosphorus; Trade name: Hishiguard LP-F; Manufacturer: Nippon Chemical Industrial Co., Ltd.; Average particle size: 5 μm

(12) Red phosphorus; Trade name: Novaexcel 140; Manufacturer: Rinkagaku Kogyo Co., Ltd.; Average particle size: 30 μm

(13) Carbon; Trade name: Asahi Carbon #70; Manufacturer: Asahi Carbon Co., Ltd.

The blended content and the evaluation results of the respective materials are shown in Tables 3 and 4.

TABLE 3

| First Test Example | 1 | 2 | 3 | 4 | 5 | 6 | 7 |
|---|---|---|---|---|---|---|---|
| Umerit 2525F | 60 | 60 | 60 | 50 | 50 | | |
| Umerit 1540F | | | | | | 60 | 60 |
| PB222A | 20 | 20 | 20 | 20 | 20 | 20 | 20 |
| Maleic acid modified polypropylene-based TPO | | | | 15 | 15 | 10 | 10 |
| L-6100M | 10 | 10 | 5 | 15 | 15 | 10 | 10 |
| Nucrel 1207C | | | 5 | | | | |
| Kraton 1901FG | 10 | | 10 | | | | |
| NUC6510 | | 10 | | | | | |
| Fatty-acid-treated magnesium hydroxide | 45 | 45 | 45 | 45 | 90 | 45 | 120 |
| Silane-treated magnesium hydroxide | 45 | 45 | 45 | 45 | | 45 | |
| Hishiguard LP-F | 5 | 5 | 5 | 5 | 5 | 5 | 5 |
| Asahi Carbon #70 | 4 | 4 | 4 | 4 | 4 | 4 | 5 |
| Tensile strength (MPa) | 15.6 | 16.7 | 16.8 | 15.3 | 15.8 | 16.8 | 15.8 |
| Stretch (%) | 687 | 529 | 610 | 493 | 440 | 532 | 490 |
| Hardness (Shore D) | 58 | 58 | 60 | 63 | 62 | 59 | 60 |
| Low friction properties | ○ | ○ | ○ | ○ | ○ | ○ | ○ |
| 60 degree incline flame test | Pass | Pass | Pass | Pass | Pass | Pass | Pass |
| Appearance | ○ | ○ | ○ | ○ | ○ | ○ | ○ |

TABLE 4

| Comparative Example | 1 | 2 | 3 | 4 | 5 | 6 | 7 |
|---|---|---|---|---|---|---|---|
| Umerit 2525F | | 45 | 80 | 10 | 60 | 60 | 60 |
| PB222A | 10 | 40 | | 70 | 20 | 20 | 20 |
| L-6100M | 10 | 10 | 10 | 10 | 10 | 10 | 10 |
| NUC6510 | 80 | 5 | 10 | 10 | 10 | 10 | 10 |
| Fatty-acid-treated magnesium hydroxide | 90 | 90 | 90 | 90 | 50 | 200 | 45 |
| Silane-treated magnesium hydroxide | | | | | | | 45 |
| Hishiguard LP-F | 5 | 5 | 5 | 5 | 5 | 5 | |
| Novaexcel 140 | | | | | | | 5 |
| Asahi Carbon #70 | 4 | 4 | 4 | 4 | 3 | 6 | 4 |
| Tensile strength (MPa) | 11.0 | 14.3 | 17.8 | 14.0 | 17.8 | 11.0 | 12.4 |
| Stretch (%) | 540 | 120 | 630 | 85 | 670 | 30 | 510 |
| Hardness (Shore D) | 45 | 63 | 52 | 64 | 55 | 65 | 58 |
| Low friction properties | X | ○ | ○ | ○ | ○ | X | X |
| 60 degree incline flame test | Pass | Pass | Pass | Pass | Fail | Pass | Pass |
| Appearance | ○ | ○ | X | X | ○ | X | X |

As is clear from Tables 3 and 4, the first test examples 1 to 7, which are optical fiber cables according to the present invention shown in Table 3 and which followed the principles of the present invention, obtained good results for all of the evaluation items.

In contrast, for the cable of Comparative Example 1, which was not blended with component (a), there were problems with hardness and low friction properties, while for Comparative Example 2, whose component (a) blended content was not in the range of the present invention, there were problems with low friction properties and hardness. Further, for Comparative Example 3, which was not blended with component (b), hardness was not satisfactory, while for Comparative Example 4, whose component (b) blended content exceeded the range of the present invention, stretch and low friction properties were unsatisfactory. In Comparative Example 5, which had a magnesium hydroxide blended content lower than the range of the present invention, hardness and flame retardance received a "fail" evaluation, while conversely, Comparative Example 6, which had too high a magnesium hydroxide blended content, had poor stretch, low friction properties and appearance results. Further, for Comparative Example 7, which used red phosphorus having an average particle size exceeding the range of the present invention, the low friction properties and appearance results were poor. As described above, according to the optical fiber cord and cable of the present invention, because the coefficient of kinetic friction of the sheath surface is small, the cable surface is very slippery. Therefore, it is more difficult for a cicada to perch on the cable surface, specifically, the sheath surface, which makes it more difficult for the cicada to lay eggs. As a result, opportunities for the cicada to pierce the optical fiber cable with its ovipositor decrease, meaning that damage resulting from the optical fiber inside the sheath being pierced by the ovipositor, and the risk of increased transmission loss of the optical fiber cable due to moisture such as rain water infiltrating in from the holes formed by the ovipositor can be dramatically reduced.

Further, even should a cicada perch on the cable surface, since the sheath is hard, the cicada finds it difficult to pierce the sheath with its ovipositor. As a result, opportunities for the cicada to pierce this optical fiber cable with its ovipositor decrease, meaning that damage resulting from the sheath internal optical fiber cable being pierced by the ovipositor, and the risk of increased transmission loss of the optical fiber cable due to moisture infiltrating into the cable interior from the holes formed by the ovipositor can be dramatically reduced. Further, the optical fiber cord and cable according to the present invention comprise the halogen-free flame retardant material and do not discharge harmful heavy metal compounds, large amounts of smoke or harmful gases during disposal in a land fill or by burning.

Test Example 2

Each of the components of the flame retardant composition (P) used for the sheath material of the optical fiber cord or cable of the second test examples of the above-described embodiment will now be described.

Polyethylene Resin (a)

The polyethylene resin is preferably HDPE (high density polyethylene), LLDPE (linear low-density polyethylene), LDPE (low density polyethylene), VLDPE (very low density polyethylene) and the like. The density is not especially limited, but is usually 0.900 g/cm$^3$ or more and 0.960 g/cm$^3$ or less. A polyethylene resin synthesized in the presence of a single site catalyst is especially preferable. Preferably, the polyethylene resin has a melt flow index (ASTM D-1238) of 0.5 to 30 g/10 min. As the production method for this resin, a known method described, for example, in Japanese Patent Application Laid-Open No. H06-306121 or National Publication of International Patent Application No. H07-500622 can be used. Examples of the polyethylene resin which can be used in the present invention include Novatech HE122R (trade name, manufactured by Japan Polyethylene Corporation), Hi-zex 5305E (trade name, manufactured by Ube-Maruzen Polyethylene Co., Ltd.), UE320 (trade name, manufactured by Japan Polyethylene Corporation) and the like. The content of the polyethylene resin in the present invention is 90 to 50 mass %, and preferably 80 to 50 mass %, of the above-described thermoplastic resin (A).

Polyolefin Modified by an Unsaturated Carboxylic Acid or its Derivative (b-1) and Ethylene-(Meth)Acrylic Acid Copolymer (b-2)

The "polyolefin modified by an unsaturated carboxylic acid or its derivative" (hereafter, sometimes collectively referred to as "unsaturated carboxylic acid") refers to a resin which has undergone graft polymerization by modifying a polyolefin with an unsaturated carboxylic acid or its derivative. Examples of the unsaturated carboxylic acid include acrylic acid, methacrylic acid, maleic acid, itaconic acid, fumaric acid and the like. Examples of a derivative of the unsaturated carboxylic acid include an acrylic ester, a methacrylic acid ester, a maleic acid monoester, a maleic acid diester, maleic anhydride, an itaconic acid monoester, an itaconic acid diester, itaconic acid anhydride, a fumaric acid monoester, a fumarate diester, anhydrous fumaric acid and the like. Examples of the polyolefin include polyethylene (linear polyethylene, ultra low density polyethylene, high density polyethylene), polypropylene (homopolypropylene, a propylene-ethylene random copolymer, a propylene-ethylene block copolymer, a copolymer of propylene and a small amount of another α-olefin (e.g. 1-butene and 1-hexene, 4-methyl-1-pentene)), a copolymer of ethylene and an α-olefin, an ethylene-vinylacetate copolymer, an ethylene-(meth) acrylate copolymer, a styrene copolymer and the like. Modification of the polyolefin can be performed, for example, by heating and kneading a polyolefin, an unsaturated carboxylic acid and the like in the presence of an organic peroxide. The amount modified by the unsaturated carboxylic acid etc. is preferably 0.5 to 15 mass %. Specific examples of the polyolefin modified by an unsaturated carboxylic acid etc. include "Polybond" (trade name, manufactured by Crompton), Adtex (trade name, manufactured by Japan Polyethylene Corporation), Admer (trade name, manufactured by Mitsui Chemicals, Inc.), Kraton (trade name, manufactured by Kraton JSR Elastomers K.K.) and the like. Examples of the ethylene-(meth)acrylic acid copolymer according to the present invention include an ethylene-acrylic acid copolymer and an ethylene-methacrylic acid copolymer. Specific examples include Nucrel (trade name, Du Pont-Mitsui Polychemicals Co., Ltd.). In the present invention, the component (b-1) and/or component (b-2) may be used either as one kind or in combination of two kinds of more. In the present invention, by chemically bonding with the below-described magnesium hydroxide during molding, the component (b-1) and component (b-2) can obtain high flame retardance, mechanical properties and abrasion resistance. These excellent effects are especially marked when the polyolefin and ethylene (meth) acrylic acid copolymer modified by acrylic acid or methacrylic acid are used. Therefore, in the present invention it is more desirable to use or combine the polyolefin and ethylene (meth)acrylic acid copolymer modified by acrylic acid or methacrylic acid as the components (b-1) and/or (b-2). The content of the component (b-1) and/or component (b-2) in the present invention is 5 to 30 mass %, and preferably 5 to 25 mass %, of the above-described thermoplastic resin (A). If this content is exceeded, stretch is markedly reduced.

Polypropylene Resin (c)

Examples of the polypropylene resin which can be used in the present invention include a homopolypropylene, an ethylene/propylene random copolymer, an ethylene/propylene block copolymer, a copolymer of propylene with a small amount of another α-olefin (e.g., 1-butene, 1-hexene, and 4-methyl-1-pentene), and a copolymer of propylene and ethylenepropylene (TPO). Here, "ethylene/propylene random copolymer" means one in which the content of the ethylene component is in a range of about 1 to 4 mass %, and "ethylene/propylene block copolymer" means one in which the content of the ethylene component is in a range of about 5 to 20 mass %. The content of the polypropylene resin in the present invention is 0 to 40 mass %, and preferably 0 to 35 mass %, of the above-described thermoplastic resin (A).

Styrene Elastomer (d)

Styrene Elastomer

The styrene elastomer in the present invention is a block copolymer or a random copolymer composed of a styrene polymer block S and at least one polymer block B having a conjugated diene compound as a main component, or a product obtained by hydrogenation of such block or random copolymer. Alternatively, the styrene elastomer may be a mixture thereof. Examples of the styrene elastomer include a copolymer of a vinyl aromatic compound—conjugated diene compound having a S—B—S, B—S—B—S, S—B—S—B—S, $S_{m1}$—$B_{n1}$—$S_{m2}$—$B_{n2}$ etc. structure, or a product obtained by hydrogenation of such copolymer.

Examples of the conjugated diene compound include one kind or more selected from butadiene, isoprene, 1,3-pentadiene, 2,3-dimethyl-1,3-butadiene and the like. Among these, preferred are butadiene, isoprene and a combination thereof. Specific examples of the above-described styrene elastomer include HSBR (hydrogenated styrene-butadiene elastomer), SBS (styrene-butadiene-styrene block copolymer), SIS (styrene-isoprene-styrene block copolymer), SEBS (styrene-ethylene/butadiene-styrene block copolymer), SEPS (styrene-ethylene/propylene-styrene block copolymer) and the like. Modified products of these may also be used. Examples of the styrene copolymer modified by an unsaturated carboxylic acid include Kraton 1901FG (manufactured by Kraton Polymers Japan Ltd.). The content of the component (d) in the present invention is 0 to 30 mass %, and preferably 0 to 15 mass %, of the above-described thermoplastic resin (A).

Ethylene Vinyl Acetate Copolymer (e-1) and Ethylene-(Meth)Acrylate Copolymer (e-2)

A copolymerization product of ethylene and vinyl acetate can be used for the ethylene-vinyl acetate copolymer. Examples thereof include Evaflex (trade name, manufactured by Du Pont-Mitsui Polychemicals Co., Ltd.), Ultracene (trade name, manufactured by Tosoh Corporation) and the like. Further, examples of the ethylene-(meth)acrylate copolymer include ethylene-ethylacrylate copolymer (EEA), ethylene-methylacrylate copolymer (EMA), ethylene-butylacrylate copolymer (EBA), ethylene-methylmethacrylate copolymer (EMMA) and the like. Specific examples include NUC (trade name, manufactured by Nippon Unicar Company Limited). The content of component (e) in the present invention is preferably 0 to 40 mass % of the above-described thermoplastic resin (A).

Metal Hydrate (B)

Examples of the metal hydrate in the flame retardant composition (P) used in the present invention include aluminum hydroxide, magnesium hydroxide and the like. From the perspective of flame retardance, magnesium hydroxide is preferred. In the present invention magnesium hydroxide which is usually commercially available may be used. In the present invention, the magnesium hydroxide may be used without any treatment, or after subjecting to a surface treatment. Examples of the surface treatment include fatty acid treatment, phosphoric acid treatment, titanate treatment, treatment with a silane coupling agent and the like. From the standpoint of reactivity with the resin component (A), in the present invention it is preferred to use a product that was not treated or which was treated using a silane coupling agent. The silane coupling agent in the present invention preferably has a vinyl group, a methacryloxy group, a glycidyl group or an amino group on its end. Specific examples include vinyltrimethoxysilane, vinyltriethoxysilane, glycidoxypropyltrimethoxysilane, glycidoxypropyltriethoxysilane, glycidoxypropylmethyldimethoxysilane, methacryloxypropyltrimethoxysilane, methacryloxypropyltriethoxysilane, methacryloxypropylmethyldimethoxysilane, mercaptopropyltrimethoxysilane, mercaptopropyltriethoxysilane, aminopropyltriethoxysilane, aminopropyltrimethoxysilane, N-(β-aminoethyl)-γ-aminopropyltripropylmethyldimethoxysilane, N-(β-aminoethyl)-γ-aminopropyltripropyltrimethoxysilane and the like. Among these, vinyltrimethoxysilane, vinyltriethoxysilane, methacryloxypropyltriethoxysilane, methacryloxypropylmethyldimethoxysilane and the like are preferred. Although the method for surface treatment with a silane coupling agent can be carried out by a commonly used method, the magnesium hydroxide may also be obtained by subjecting magnesium hydroxide which has not been surface treated in advance to dry-blending, wet processing, blending with the silane coupling agent during kneading and the like. The silane coupling agent may be appropriately added in an amount sufficient for the surface treatment. Specifically, however, the blended content of the used silane coupling agent is 0.1 to 2.5 mass %, preferably 0.2 to 1.8 mass %, and more preferably 0.3 to 1.0 mass %, based on the magnesium hydroxide. Further, magnesium hydroxide which has already undergone silane coupling agent surface treatment can be acquired. Specific examples of magnesium hydroxide which has been surface treated with a silane coupling agent include Kisuma 5L, Kisuma 5N and Kisuma 5P (all trade names, manufactured by Kyowa Chemical Industry Co., Ltd.) and the like. Further, examples of untreated magnesium hydroxide include Kisuma 5 (trade name, manufactured by Kyowa Chemical Industry Co., Ltd.), Magnifin H5 (trade name, manufactured by Albemarle Corporation) and the like. In the present invention, in the case of treating the magnesium hydroxide with a silane coupling agent, any one kind of silane coupling agent or a combination of two or more kinds may be used. In the present invention, magnesium hydroxide which has not been surface treated and magnesium hydroxide which has been surface treated may respectively be used alone or in combination. Magnesium hydroxides which have undergone different surface treatments may also be used together. The blended content of the metal hydrate of the magnesium hydroxide and the like in the present invention is 60 to 150 parts by mass, preferably 70 to 140 parts by mass, and more preferably 90 to 120 parts by mass, based on 100 parts by mass of the resin component. If the blended content is too low, there is a problem with flame retardance, while if the blended content is too high, stretch is reduced, mechanical strength is markedly reduced and low-temperature brittleness is reduced.

Red Phosphorus (C)

To maintain high flame retardance, it is preferable to include red phosphorus in the flame retardant composition (P). Powdered red phosphorus has excellent dispersibility, and good mechanical properties and flame retardance. Further, the red phosphorus is not used as is, but with an inorganic or organic coating. Further, the red phosphorus used in the present invention may have an average particle size of 3 to 9 µm. If the red phosphorus is larger than 9 µm, appearance and mechanical strength markedly deteriorate, while if the red phosphorus is smaller than 3 µm, the kneading step becomes much more difficult. The content of this red phosphorus is preferably 0 to 10 parts by mass based on 100 parts by mass of the thermoplastic resin (A). If the content is too much, the mechanical properties deteriorate.

The flame retardant composition (P) used in the present invention may optionally include one or more selected from zinc stannate, zinc hydroxystannate and zinc borate to further improve flame resistance. The zinc stannate, zinc hydroxystannate and zinc borate used in the present invention preferably have an average particle size of not more than 5 µm, and more preferably not more than 3 µm. Specific examples of the zinc borate which can be used in the present invention include Alcanex FRC-500 ($2ZnO/3B_2O_3.3.5H_2O$), FRC-600 (both trade names, manufactured by Mizusawa Industrial Chemicals Ltd.) and the like. Further, examples of the zinc stannate ($ZnSnO_3$) and the zinc hydroxystannate ($ZnSn(OH)_6$) include Alcanex ZS, Alcanex ZHS (both trade names, manufactured by Mizusawa Industrial Chemicals Ltd.) and the like. The content of the zinc stannate, zinc hydroxystannate or zinc borate in the present invention is preferably 2 to 20 parts by mass, and more preferably 3 to 20 parts by mass, based on 100 parts by mass of the thermoplastic resin (A). If this content is too small, the effects of improved flame retardance are not exhibited, while if the content is too large, the mechanical properties, especially stretching, deteriorate, whereby the appearance when used as cord or cable worsens.

The flame retardant composition (P) used in the present invention may appropriately include various kinds of commonly-used additive agents to the extent that the purpose of the present invention is not harmed. Examples include an antioxidant, a metal deactivator, a flame retardant (aid), a filler, a lubricant and the like. Examples of the antioxidant include amine antioxidants, such as a polymer of 4,4'-dioctyl diphenylamine, N,N'-diphenyl-p-phenylene diamine and 2,2, 4-trimethyl-1,2-dihydroquinoline; phenolic antioxidants, such as pentaerythrityl tetrakis(3-(3,5-di-t-butyl-4-hydroxyphenyl)propionate), octadecyl-3-(3,5-di-t-butyl-4-hydroxyphenyl)propionate and 1,3,5-trimethyl-2,4,6-tris(3,5-di-t-butyl-4-hydroxybenzyl)benzene; sulfur antioxidants, such as bis(2-methyl-4-(3-n-alkylthiopropionyloxy)-5-t-butylphenyl)sulfide, 2-mercaptobenzimidazole and its zinc salt, and pentaerythritol tetrakis(3-lauryl-thiopropionate) and the like. Examples of the metal deactivator include N,N'-bis(3-(3,5-di-t-butyl-4-hydroxyphenyl)propionyl)hydrazine, 3-(N-salicyloyl)amino-1,2,4-triazole and 2,2'-oxamidebis-(ethyl-3-(3,5-di-t-butyl-4-hydroxyphenyl)propionate) and the like. Examples of the flame retardant (aid) and filler include carbon, clay, zinc oxide, tin oxide, titanium oxide, magnesium oxide, molybdenum oxide, antimony trioxide, a silicone compound, quartz, talc, calcium carbonate, magnesium carbonate, white carbon and the like. Carbon (black) especially also has an effect of improving light resistance. Examples of the lubricant include hydrocarbons, fatty acids, fatty-acid-amides, esters, alcohols, metal soaps and the like. Among these, preferred are esters, alcohols, metal soaps and the like, which simultaneously exhibit internal slippage and external slippage, such as Wax E and Wax OP (both trade names, manufactured by Hoechst A.G.).

The flame retardant composition used for the optical fiber cord and cable according to the present invention can be obtained by melt-kneading the above-described respective components in a commonly-used kneading apparatus, such as a twin-screw kneader-extruder, a Banbury mixer, a kneader, a roll and the like.

Further, in the present invention, a crosslinked flame retardant resin composition of the present invention may be used as an outer covering layer. In one method for crosslinking, a polymer is bonded to a silane coupling agent, and then a crosslinking may be performed. In another method, while a portion of a resin is crosslinked by using a kneader and a Banbury mixer during preparing a resin composition, a polymer is coupled with a metal hydrate through a silane coupling agent.

In further method for crosslinking, after extrusion, the covering layer may be crosslinked. An electron beam irradiation crosslinking method and a chemical crosslinking method may be employed for performing a crosslinking. These methods may be performed according to common steps.

In the case of the electron beam crosslinking method, after a flame retardant resin composition of the present invention is extruded to form a covering layer, it is irradiated with an electron beam in a usual manner, to carry out the crosslinking. A dose of an electron beam is suitably 1 to 30 Mrad. For performing efficiently a crosslinking, a polyfunctional compound such as a methacrylate-type compound (such as trimethylol propane triacrylate), an allyl-type compound (such as triallyl cyanurate), a maleimide-type compound, divinyl-type compound and the like may be added to flame retardant resin composition constituting a covering layer as a crosslinking auxiliary agent.

When a chemical crosslinking method is employed, an organic peroxide is added as a crosslinking agent to a flame retardant resin composition, and after a covering layer is formed using an extrusion process, a crosslinking is performed by a heat treatment according to common steps.

EXAMPLES

The present invention will now be described more specifically and in more detail with the second test examples. However, the present invention is not limited to these examples. Further, unless otherwise noted, the term "parts" representing the composition indicates "parts by mass".

Test Examples and Comparative Examples

The content of the respective components of the resin composition of the second test examples is shown in Table 5, and that for the comparative examples is shown in Table 6. In table 5, second working examples 1 to 7 according to the principles of the present invention are illustrated for the case where the content of the respective components of the resin composition is varied.

First, the respective components shown in the following Tables 5 and 6 were dry-blended at room temperature (23±2° C.), and the resultant mixture was melt-kneaded using a Banbury mixer to produce various flame retardant resin compositions. Next, using an extrusion coater, the already melt-kneaded flame retardant resin composition was coated by an extrusion method onto a four optical fiber ribbon, a 1.2 mm-diameter support wire made of steel wire, and two 0.5 mm-diameter tension members made of aramid FRP, to produce individual cables. The long side of the sheath excluding the support wire was 3.8 mm, and the short side was 2.0 mm. The neck portion had a length of 0.2 mm and a thickness of 0.2 mm. The outer diameter of the sheath coating the support wire was 2.0 mm, and the height of the whole optical fiber cable was 6.0 mm. The obtained optical fiber cables were evaluated as follows.

(Tension Test)

A No. 3 dumbbell test piece was fabricated based on JIS K 6723 from a 1.0 mm sheet formed by roll pressing the coated flame retardant resin composition in order to carry out the tension test. The test was carried out with a marked interval of 20 mm and a tension rate of 200 mm/min. A stretch of 300% or more and a tensile strength of 4.9 MPa is necessary.

(Hardness)

Type D Durometer hardness (hereinafter, referred to as "shore D hardness") was measured based on JIS K 7215 using a sheet formed by roll pressing the coated flame retardant resin composition. A shore D hardness of 57 or more is preferred so that even if a cicada perches on the cable (sheath) surface, because the sheath is hard, the cicada finds it difficult to pierce the sheath with its ovipositor.

(Low Friction Resistance)

The coefficient of kinetic friction was measured based on JIS K 7125. The same sheath material was used as the counter material. A coefficient of kinetic friction of 0.45 or less is preferred to make it more difficult for a cicada to perch on the cable (sheath) surface and more difficult to lay eggs.

(Flame Retardance)

The 60 degree incline flame test specified in JIS C 3005 was carried out, and a pass/fail determination was made.

(Appearance)

The surface appearance after extrusion was visually confirmed and evaluated. Test pieces having a good appearance were indicated with a circle, and those which had a poor appearance, such as a rough surface, and were not at a product level were indicated with a cross.

As the respective components, the following were used.

(01) High density polyethylene (density: 938 kg/m$^3$); Trade name: Novatech HE122R; Manufacturer: Japan Polyethylene Corporation

(02) High density polyethylene (density: 951 kg/m$^3$); Trade name: Hi-zex 5305E; Manufacturer: Ube-Maruzen Polyethylene Co., Ltd.

(03) Linear low density polyethylene (density: 922 kg/m$^3$); Trade name: UE320; Manufacturer: Japan Polyethylene Corporation

(04) Maleic acid modified polyethylene; Trade name: L-6100M; Manufacturer: Japan Polyethylene Corporation; Maleic acid modified content: 1 mass %

(05) Ethylene-methacrylic acid copolymer; Trade name: Nucrel N1207C; Manufacturer: Du Pont-Mitsui Polychemicals Co., Ltd.; Methacrylic content: 12 mass %

(06) Random polypropylene (R—PP); Trade name: PB22A; Manufacturer: SunAllomer Ltd.

(07) Maleic acid modified styrene elastomer; Trade name: Kraton 1901FG; Manufacturer: Kraton Polymers Japan Ltd.; Maleic acid modified content: 1.7 mass %

(08) Ethylene-ethylacrylate copolymer; Trade name: NUC-6510; Manufacturer: Nippon Unicar Company Limited

(09) Fatty-acid-treated magnesium hydroxide silane-treated magnesium hydroxide

(10) Silane-treated magnesium hydroxide

(11) Red phosphorus; Trade name: Hishiguard LP-F; Manufacturer: Nippon Chemical Industrial Co., Ltd.; Average particle size: 5 μm

(12) Red phosphorus; Trade name: Novaexcel 140; Manufacturer: Rinkagaku Kogyo Co., Ltd.; Average particle size: 30 μm.

(13) Carbon; Trade name: Asahi Carbon #70; Manufacturer: Asahi Carbon Co., Ltd.

The blended content and the evaluation results of the respective materials are shown in Tables 5 and 6.

TABLE 5

| Second Test Example | 1 | 2 | 3 | 4 | 5 | 6 | 7 |
|---|---|---|---|---|---|---|---|
| Novatech HE122R | 70 | | 40 | 70 | 70 | 70 | 40 |
| Hi-zex 5305E | | 70 | | | | | |
| UE320 | | | 40 | | | | 40 |
| L-6100M | 20 | 20 | 10 | 20 | 20 | 10 | 10 |
| Nucrel 1207C | | | | | | 10 | |
| E-150GK | | | | | 5 | | |
| Kraton 1901FG | | | | | | 10 | |
| NUC6510 | 10 | 10 | 10 | 5 | | 10 | 10 |
| Fatty-acid-treated magnesium hydroxide | 90 | 90 | 90 | 45 | 90 | 90 | 120 |
| Silane-treated magnesium hydroxide | | | | 45 | | | |
| Hishiguard LP-F | 5 | 5 | 5 | 5 | 5 | 5 | 5 |
| Asahi Carbon #70 | 4 | 4 | 4 | 4 | 4 | 4 | 5 |
| Tensile strength (MPa) | 17.3 | 15.2 | 13.3 | 17.8 | 17.2 | 18.2 | 12.0 |
| Stretch (%) | 588 | 432 | 553 | 523 | 580 | 460 | 530 |
| Hardness (Shore D) | 60 | 63 | 59 | 63 | 61 | 63 | 60 |
| Low friction properties | ○ | ○ | ○ | ○ | ○ | ○ | ○ |
| 60 degree incline flame test | Pass | Pass | Pass | Pass | Pass | Pass | Pass |
| Appearance | ○ | ○ | ○ | ○ | ○ | ○ | ○ |

TABLE 6

| Comparative Example | 1 | 2 | 3 | 4 | 5 | 6 | 7 |
|---|---|---|---|---|---|---|---|
| Novatech HE122R | | 45 | 60 | 60 | 70 | 60 | 70 |
| UE320 | | | 20 | | | | |
| L-6100M | 10 | 15 | | 15 | 20 | 10 | 20 |
| N1207C | | | 20 | | | | |
| PB222A | 10 | | | | | 20 | |
| NUC6510 | 80 | 40 | 20 | 5 | 10 | 10 | 10 |
| Fatty-acid-treated magnesium hydroxide | 90 | 90 | 90 | 90 | 50 | 200 | 90 |
| Hishiguard LP-F | 5 | 5 | 5 | 5 | 5 | 5 | 5 |
| Novaexcel 140 | | | | | | | 5 |
| Asahi Carbon #70 | 4 | 4 | 4 | 4 | 3 | 6 | 4 |
| Tensile strength (MPa) | 11.0 | 12.5 | 13.2 | 11.8 | 17.9 | 11.5 | 15.6 |
| Stretch (%) | 540 | 650 | 620 | 60 | 680 | 40 | 510 |
| Hardness (Shore D) | 45 | 51 | 55 | 59 | 56 | 66 | 59 |
| Low friction properties | X | X | ○ | X | ○ | X | X |
| 60 degree incline flame test | Pass | Pass | Pass | Pass | Fail | Pass | Pass |
| Appearance | ○ | ○ | ○ | ○ | ○ | X | X |

As is clear from Tables 5 and 6 the second test examples 1 to 7, which are optical fiber cables according to the present invention shown in Table 5 and which followed the principles of the present invention, obtained good results for all of the evaluation items. In contrast, for the cable of Comparative Example 1, which was not blended with component (a), there were problems with hardness and low friction properties, while for Comparative Example 2, whose component (a) blended content was not in the range of the present invention, there were problems with low friction properties and hardness. Further, for Comparative Example 3, which was not blended with component (b), hardness was not satisfactory, while for Comparative Example 4, whose component (b) blended content exceeded the range of the present invention, stretch and low friction properties were unsatisfactory. In Comparative Example 5, which had a magnesium hydroxide blended content lower than the range of the present invention, hardness and flame retardance received a "fail" evaluation, while conversely, Comparative Example 6, which had too high a magnesium hydroxide blended content, had poor stretch, low friction properties and appearance results. Further, for Comparative Example 7, which used red phosphorus having an average particle size exceeding the range of the present invention, the low friction properties and appearance results were poor. As described above, according to the optical fiber cord and cable of the present invention, because the coefficient of kinetic friction of the sheath surface is small, the cable surface is very slippery. Therefore, it is more difficult for a cicada to perch on the cable surface, specifically, the sheath surface, which makes it more difficult for the cicada to lay eggs. As a result, opportunities for the cicada to pierce the optical fiber cable with its ovipositor decrease, meaning that damage resulting from the sheath interior of the optical fiber cable being pierced by the ovipositor, and the risk of increased transmission loss of the optical fiber cable due to moisture such as rain water infiltrating in from the holes formed by the ovipositor can be dramatically reduced.

Further, even should a cicada perch on the cable surface, since the sheath is hard, the cicada finds it difficult to pierce the sheath with its ovipositor. As a result, opportunities for the cicada to pierce this optical fiber cable with its ovipositor decrease, meaning that damage resulting from the sheath interior of the optical fiber cable being pierced by the ovipositor, and the risk of increased transmission loss of the optical fiber cable due to moisture infiltrating into the cable interior from the holes formed by the ovipositor can be dramatically reduced. Further, the optical fiber cord and cable according to the present invention do not discharge harmful heavy metal compounds, large amounts of smoke or harmful gases during disposal in a land fill or by burning.

INDUSTRIAL APPLICABILITY

As described above, according to the present invention an optical fiber cable is provided which reliably prevent increased transmission loss due to damage of the optical fiber as a result of the egg-laying behavior of cicadas.

What is claimed is:

1. An optical fiber cable comprising:
   at least one optical fiber;
   a tension member;
   and a sheath which is collectively coated on the at least one optical fiber and the tension member, wherein
   a shore D hardness of the sheath is 55 or more,
   and a minimum distance L from a surface of the at least one optical fiber to an outer surface of the sheath is greater than 0.3 mm.

2. An optical fiber cable comprising:
   at least one optical fiber;
   a tension member;
   and a sheath which is collectively on the at least one optical fiber and the tension member, wherein
   a shore D hardness of the sheath is 57 or more,
   and a minimum distance L from a surface of the optical fiber to an outer surface of the sheath is greater than 0.2 mm.

3. An optical fiber cable comprising:
   at least one optical fiber;
   a tension member;
   and a sheath which is collectively coated on the optical fiber and the tension member, wherein
   a coefficient of friction of the sheath surface is 0.45 or less, and
   a shore D hardness of the sheath is 57 or more.

4. An optical fiber cable comprising:
   at least one optical fiber;
   a tension member;
   and a sheath which is collectively coated over the optical fiber and the tension member, wherein
   a coefficient of friction of the sheath surface is 0.47 or less, and
   a shore D hardness of the sheath is 62 or more.

5. The optical fiber cable according to claim 3, wherein the shore D hardness of the sheath is 62 or more.

* * * * *